(12) United States Patent
Thomas-Lepore et al.

(10) Patent No.: US 10,696,038 B2
(45) Date of Patent: Jun. 30, 2020

(54) MULTI-USER ACCESS TO FABRICATION RESOURCES

(71) Applicant: Stratasys, Inc., Eden Prairie, MN (US)

(72) Inventors: Grant Thomas-Lepore, Somerville, MA (US); Blake Zachary Courter, Reading, MA (US); Roger Rudolf S. Maranan, Boston, MA (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 15/378,994

(22) Filed: Dec. 14, 2016

(65) Prior Publication Data
US 2017/0173888 A1 Jun. 22, 2017

Related U.S. Application Data

(60) Provisional application No. 62/325,164, filed on Apr. 20, 2016, provisional application No. 62/268,050, filed on Dec. 16, 2015.

(51) Int. Cl.
*B33Y 50/02* (2015.01)
*H04N 1/44* (2006.01)
(Continued)

(52) U.S. Cl.
CPC ............ *B33Y 50/02* (2014.12); *B29C 64/171* (2017.08); *B29C 64/386* (2017.08); *B33Y 50/00* (2014.12);
(Continued)

(58) Field of Classification Search
CPC ....... B33Y 50/02; B33Y 50/00; B29C 64/171; B29C 64/386; G05B 17/02;
(Continued)

(56) References Cited

U.S. PATENT DOCUMENTS

| 6,983,188 B2 | 1/2006 | Loughran et al. |
| 7,403,833 B2 | 7/2008 | Holzwarth et al. |

(Continued)

FOREIGN PATENT DOCUMENTS

| WO | WO-2015022572 | 2/2015 | |
| WO | WO 2015022572 A2 * | 2/2015 | ............ B33Y 50/02 |

OTHER PUBLICATIONS

"U.S. Appl. No. 15/379,042 Non-Final Office Action dated Jun. 13, 2018", 33 pages.

*Primary Examiner* — James J Lee
*Assistant Examiner* — Michael W Choi
(74) *Attorney, Agent, or Firm* — Strategic Patents, P.C.

(57) ABSTRACT

An interactive platform supports multi-user participation in a shared virtual workspace to prepare and schedule virtual print trays for printing on a three-dimensional (3D) printer or other fabrication resource. Computerized models may be automatically positioned within the print tray, manually positioned within the print tray, or some combination of these. After objects are placed in the virtual workspace users may be given identity-based control of the print tray including, e.g., identity-specific capabilities for viewing, modifying or removing objects within the print tray. This permits improved control over aspects of interest to particular users including, e.g., security, object orientation, priority, fabrication speed, fabrication cost, and so forth within a shared fabrication environment.

30 Claims, 12 Drawing Sheets

(51) Int. Cl.
*B29C 64/171* (2017.01)
*B29C 64/386* (2017.01)
*B33Y 50/00* (2015.01)
*G05B 19/4099* (2006.01)

(52) U.S. Cl.
CPC ....... *G05B 19/4099* (2013.01); *H04N 1/4433* (2013.01); *G05B 2219/35134* (2013.01); *G05B 2219/49007* (2013.01)

(58) Field of Classification Search
CPC ...... G05B 19/4099; G05B 2219/35134; G05B 2219/49007; G05B 2219/49023; G06F 21/31; G06F 21/608; H04N 1/4433; H04N 2201/0098
USPC .......................................................... 700/98
See application file for complete search history.

(56) References Cited

U.S. PATENT DOCUMENTS

| | | | |
|---|---|---|---|
| 8,562,324 B2 | 10/2013 | Pettis | |
| 8,781,615 B2 | 7/2014 | Kritchman et al. | |
| 2005/0234577 A1* | 10/2005 | Loughran | G06Q 10/06 700/100 |
| 2008/0309665 A1 | 12/2008 | Gregory, II et al. | |
| 2009/0007221 A1* | 1/2009 | Kim | G06F 21/10 726/1 |
| 2011/0087350 A1* | 4/2011 | Fogel | G06F 17/50 700/98 |
| 2012/0092724 A1 | 4/2012 | Pettis | |
| 2012/0105903 A1* | 5/2012 | Pettis | G06F 3/12 358/1.14 |
| 2014/0074272 A1 | 3/2014 | Cowden et al. | |
| 2015/0057784 A1 | 2/2015 | Butler et al. | |
| 2015/0220291 A1 | 8/2015 | Tapley et al. | |
| 2015/0373068 A1 | 12/2015 | Allen et al. | |
| 2016/0046074 A1* | 2/2016 | Jang | B29C 67/0088 700/119 |
| 2016/0198576 A1 | 7/2016 | Lewis et al. | |
| 2017/0173889 A1 | 6/2017 | Thomas-Lepore et al. | |
| 2017/0305067 A1 | 10/2017 | Cortes et al. | |

\* cited by examiner

MULTI-USER ACCESS TO FABRICATION RESOURCES

RELATED APPLICATIONS

This application claims the benefit under 35 U.S.C. § 119(e) of U.S. Prov. App. No. 62/268,050 filed on Dec. 16, 2015 and U.S. Prov. App. No. 62/325,164 filed on Apr. 20, 2016. The entire content of each of these applications is hereby incorporated by reference.

This application is also related to the following commonly-owned U.S. Patent application filed on Dec. 14, 2016 and incorporated herein by reference in its entirety: U.S. patent application Ser. No. 15/379,042 entitled "User-Dependent Views of a Shared Print Tray."

TECHNICAL FIELD

The present disclosure generally relates to managing fabrication of computerized models with fabrication resources such as three-dimensional (3D) printers, and more specifically to managing multi-user access to the fabrication resources in an interactive environment.

BACKGROUND

A variety of techniques exist to support the fabrication of three-dimensional objects from computerized models. These techniques attempt to overcome specific challenges associated with three-dimensional fabrication such as high material costs, long processing times, limited resources, and so forth. While existing techniques may generally seek to improve queue times and increase efficiency, they do not appear to provide a truly collaborative environment for fabrication in which multiple users can interact with multiple objects in multiple virtual print trays being queued for execution on one or more printers. There remains a need for a manufacturing infrastructure that supports multi-user collaboration in the management and use of three-dimensional (3D) printers and similar fabrication resources.

SUMMARY

An interactive platform supports multi-user participation in a shared virtual workspace to prepare and schedule virtual print trays for printing on a three-dimensional (3D) printer or other fabrication resource. Computerized models may be automatically positioned within the print tray, manually positioned within the print tray, or some combination of these. After objects are placed in the virtual workspace users may be given identity-based control of the print tray including, e.g., identity-specific capabilities for viewing, modifying or removing objects within the print tray. This permits improved control over aspects of interest to particular users including, e.g., security, object orientation, priority, fabrication speed, fabrication cost, and so forth within a shared fabrication environment.

In an aspect, a computer program product for managing multi-user access to fabrication resources may include computer executable code embodied in a non-transitory computer-readable medium that, when executing on one or more computing devices, performs the steps of: receiving a plurality of computerized models of physical objects from one or more users, automatically positioning the plurality of computerized models within a virtual print tray corresponding to a build volume of a fabrication resource, submitting the virtual print tray to a print queue for allocation to one of a plurality of three-dimensional printers, and providing a user interface for access by a user to the virtual print tray, wherein a user interaction is dependent on an identity of the user.

In another aspect, a system for managing multi-user access to fabrication resources may include a plurality of three-dimensional printers, and a management facility coupled to the plurality of three-dimensional printers through a data network, the management facility including a processor and a memory, where the management facility is configured by program code stored in the memory and executable by the processor to perform the steps of: receiving a plurality of computerized models of physical objects from one or more users; automatically positioning the plurality of computerized models within a virtual print tray corresponding to a build volume of a fabrication resource; submitting the virtual print tray to a print queue for allocation to one of the plurality of three-dimensional printers; and providing a user interface for access by a user to the virtual print tray, wherein a user interaction with the virtual print tray is dependent on an identity of the user.

In yet another aspect, a method for managing multi-user access to fabrication resources may include receiving a plurality of computerized models of physical objects from one or more users, automatically positioning the plurality of computerized models within a virtual print tray corresponding to a build volume of a fabrication resource, submitting the virtual print tray to a print queue for allocation to one of a plurality of three-dimensional printers, and providing a user interface for access by a user to the virtual print tray, wherein a user interaction with the virtual print tray is dependent on an identity of the user.

Implementations may include one or more of the following features. The user interaction may include viewing the virtual print tray through the user interface by one of the users. Each one of the plurality of computerized models may be rendered within the user interface in a manner dependent upon a relationship between the one of the plurality of computerized models and the one of the users viewing the user interface. Each one of the plurality of computerized models may be rendered within the user interface according to whether the one of the users has a role that is authorized to view that one of the computerized models. The user interaction may include a modification by one of the users to one of the computerized models. The modification may include a change to at least one of a position and an orientation of the one of the computerized models. The modification may include a movement of the one of the computerized models from the virtual print tray to a second virtual print tray. The modification may include a removal of the one of the computerized models from the virtual print tray. One of the computerized models may be labelled within the user interface with owner information for an owner of the one of the computerized models. The owner information may include at least one of a user name, an organization name, and a user type for the owner. The owner information may include annotations provided by the owner. The method may further include fabricating the computerized models in the virtual print tray using one of the three-dimensional printers. The method may further include allocating the virtual print tray to one of the three-dimensional printers based on one or more criteria. The one or more criteria may include at least one of a printer capability, a printer location, a model feature for one or more of the computerized models, a priority of the virtual print tray, and a relationship among the computerized models in the virtual print tray and a number of other computerized models in one or more other virtual print trays. The method may further include displaying a visualization of build status within the user interface. The visualization of build status may include at least one of a position of the virtual print tray in the print queue, a time until printing begins, an amount of completion, and a time until printing will finish. The method may further include a control within the user interface for an owner of one of the computerized models to control how the one of the computerized models is rendered for other users viewing the virtual print tray. The method may further include displaying a print queue for the plurality of three-dimensional printers in a user interface. The method may further include receiving a user input in the user interface modifying an order of items in the print queue. The method may further include receiving a user input of an additional model to the virtual print tray containing the plurality of computerized models. The method may further include selecting one of the plurality of three-dimensional printers to fabricate the virtual print tray based on a manual user input to a user interface. The method may further include selecting two models for placement in the virtual print tray based upon a relationship between the two models, wherein the two models include a first computerized model of the plurality of computerized models and a second computerized model of the plurality of computerized models. The relationship may include one or more of: a geometric relationship, a relationship among users submitting the first computerized model and the second computerized model, a relationship of the first computerized model and the second computerized model to a multi-part object, and a relative priority of the second computerized model to the first computerized model. The method may further include concealing the first computerized model in the virtual print tray from display to other users of the virtual print tray. The method may further include concealing an object fabricated from one of the computerized models by fabricating a structure around the object during fabrication. The method may further include presenting a number of the plurality of three-dimensional printers to a user in a second user interface configured to receive a user input of a selection of one of the plurality of three-dimensional printers to fabricate the computerized models in the virtual print tray. The method may further include presenting an option to the user in the user interface to select a different three-dimensional printer for fabrication of the computerized models in the virtual print tray. The different three-dimensional printer may include a second three-dimensional printer sharing a local area network with a three-dimensional printer allocated to the virtual print tray. The method may further include presenting a plurality of quotations from external fabrication resources for fabrication of the computerized models and receiving a selection of one of the plurality of quotations from the user. The method may further include automatically recommending a suggested three-dimensional printer to the user for fabricating one of the computerized models. The method may further include suggesting a combination of two or more virtual print trays in the print queue for fabricating a number of computerized models from the user. The method may further include receiving a user comment within a virtual environment including the virtual print tray, wherein the user comment is made available to one or more other users of the virtual environment. The method may further include receiving a user input locking the virtual print tray to prevent further changes. The method may further include receiving a system input automatically locking the virtual print tray at a predetermined time before fabrication. The method may further include receiving a first computerized model in the virtual print tray from a first user, and receiving a modification to the first computerized model from a second user different from the first user.

In an aspect, a computer program product for managing multi-user access to fabrication resources may include computer executable code embodied in a non-transitory computer-readable medium that, when executing on one or more computing devices, performs the steps of receiving a first computerized model of a first object from a first user for fabrication with a three-dimensional printer, positioning the first computerized model within a virtual print tray corresponding to a build volume of the three-dimensional printer, receiving a second computerized model of a second object from a second user different than the first user for fabrication with the three-dimensional printer, positioning the second computerized model within the virtual print tray, queuing the virtual print tray including the first computerized model and the second computerized model for fabrication with the three-dimensional printer, providing a user interface to the first user with a view of the virtual print tray that includes a cloaked rendering of the second object that obfuscates one or more features of the second object, and providing a control within the user interface for the first user to request a modification to the first computerized model within the virtual print tray.

In another aspect, a system for managing multi-user access to fabrication resources may include a three-dimensional printer, and a management facility coupled to the three-dimensional printer through a data network, the management facility including a processor and a memory, where the management facility is configured by program code stored in the memory and executable by the processor to perform the steps of: receiving a first computerized model of a first object from a first user for fabrication with the three-dimensional printer; positioning the first computerized model within a virtual print tray corresponding to a build volume of the three-dimensional printer; receiving a second computerized model of a second object from a second user different than the first user for fabrication with the three-dimensional printer; positioning the second computerized model within the virtual print tray; queuing the virtual print tray including the first computerized model and the second computerized model for fabrication with the three-dimensional printer; providing a user interface to the first user with a view of the virtual print tray that includes a cloaked rendering of the second object that obfuscates one or more features of the second object; and providing a control within the user interface for the first user to request a modification to the first computerized model within the virtual print tray.

In yet another aspect, a method for managing views of a multi-user print job may include receiving a first computerized model of a first object from a first user for fabrication with a three-dimensional printer, positioning the first computerized model within a virtual print tray corresponding to a build volume of the three-dimensional printer, receiving a second computerized model of a second object from a second user different than the first user for fabrication with the three-dimensional printer, positioning the second computerized model within the virtual print tray, queuing the virtual print tray including the first computerized model and the second computerized model for fabrication with the three-dimensional printer, providing a user interface to the first user with a view of the virtual print tray that includes a cloaked rendering of the second object that obfuscates one or more features of the second object, and providing a control within the user interface for the first user to request a modification to the first computerized model within the virtual print tray.

Implementations may include one or more of the following features. The cloaked rendering may include a convex hull of the second object. The cloaked rendering may include a reduced-resolution rendering of the second object. The cloaked rendering may include an out-of-focus rendering of the second object. The modification may include a removal of the first computerized model. The modification may include a change to at least one of a position and an orientation of the first computerized model. The modification may include a scaling of the first computerized model within the virtual print tray. The method may further include presenting an annotation about an owner of the first computerized model within the virtual print tray. The method may further include providing second interface for a manager of the three-dimensional printer to queue the virtual print tray for fabrication. The method may further include providing a second interface for a manager of the three-dimensional printer to respond to the modification requested by the first user. The method may further include fabricating the first object and the second object in a single fabrication process with the three-dimensional printer. The method may further include displaying a print queue for the three-dimensional printer in a second user interface. The method may further include receiving a user input in the second user interface requesting a change to an order of items in the print queue. The method may further include receiving a user input of an additional model to the virtual print tray containing the first computerized model and the second computerized model. The method may further include displaying a status of a print job that includes the virtual print tray in the user interface. The status may include a textual description of the print job. The status may include a visual rendering of a current state of the print job. Receiving the first computerized model may include automatically selecting the first computerized model from a queue of objects based on an availability of the three-dimensional printer. Receiving the second computerized model may include automatically selecting the second computerized model from a queue of objects for placement in the virtual print tray based on a relationship to the first computerized model. The relationship may include one or more of: a geometric relationship, a relationship among users submitting the first computerized model and the second computerized model, a relationship of the first computerized model and the second computerized model to a multi-part object, and a relative priority of the second computerized model to the first computerized model. The method may further include concealing the first computerized model in the virtual print tray from display to other users of the virtual print tray. The method may further include concealing the first object in a build volume of the three-dimensional printer by fabricating a structure around the first object during fabrication. The method may further include presenting an option to the first user in the user interface to select a different fabrication resource for fabrication of the first object. The different fabrication resource may include a second three-dimensional printer sharing a local area network with the three-dimensional printer. The different fabrication resource may include a remote fabrication resource. The method may further include receiving a request for a change to the first computerized model in the virtual print tray from a third user different than the first user.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
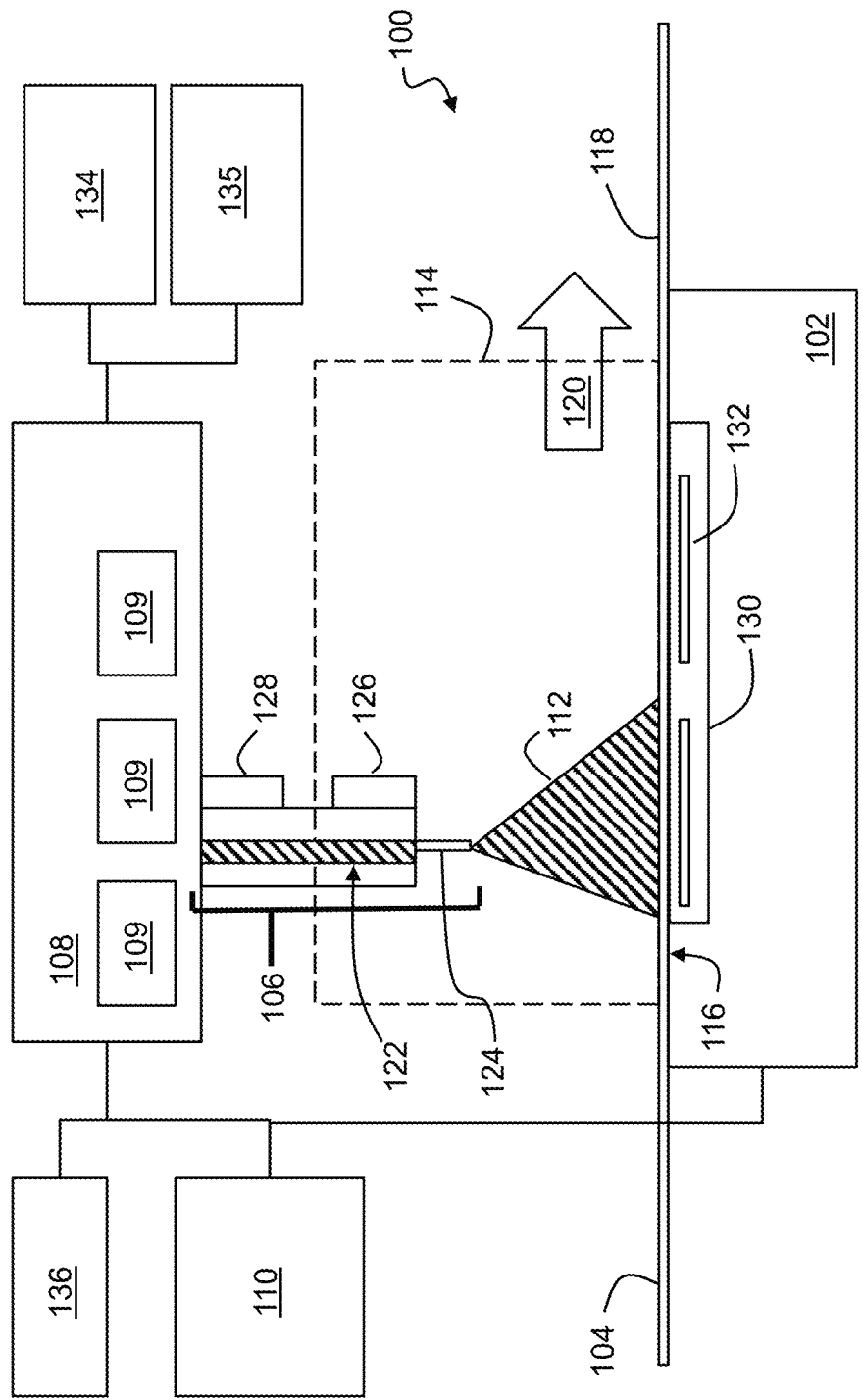
FIG. 1 is a block diagram of a three-dimensional (3D) printer.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms unless specifically stated.

Described herein are devices, systems, and methods for managing multi-user access to fabrication resources such as three-dimensional (3D) printers. The following description emphasizes the implementation of 3D printers using fused deposition modeling or similar techniques where a bead of material is extruded in a layered series of two dimensional patterns as "roads," "paths," or the like to form a three-dimensional object from a digital model. It will be understood, however, that numerous additive fabrication techniques are known in the art including without limitation multijet printing, stereolithography, Digital Light Processor (DLP) 3D printing, selective laser sintering, and so forth. Such techniques may benefit from the systems and methods described below, and all such printing technologies are intended to fall within the scope of this disclosure, and within the scope of terms such as "printer," "3D printer," "three-dimensional printer," "fabrication system," and so forth, unless a more specific meaning is explicitly provided or otherwise clear from the context. Thus, by way of example and not of limitation, the following type of 3D printer (or simply "printer") may be adapted for use with a multi-user platform and interface as contemplated herein.

FIG. 1 is a block diagram of a 3D printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus, the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102. Thus, the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are shown and described in further detail below.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

The extruder 106 may include a chamber 122 in an interior thereof to receive a build material. The build material may, for example, include acrylonitrile butadiene styrene (ABS), high-density polyethylene (HDPL), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for 3D printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus, by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional (3D) models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware such as a 3D print server, or within a web page provided by a web server hosted by the 3D printer 100. Thus, in one aspect there is disclosed herein a user interface adapted to present a video feed from at least one video camera of a 3D printer to a remote user through a user interface.

The sensor 134 may also include more complex sensing and processing systems or subsystems, such as a three-dimensional (3D) scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the 3D printer 100 including without limitation pass/fail decisions, error detection (and corresponding audible or visual alerts), shape detection, position detection, orientation detection, collision avoidance, and so forth.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and so forth. Other hardware 135 may also or instead include a variety of cable connections and/or hardware adapters for connecting to, e.g., external computers, external hardware, external instrumentation or data acquisition systems, and so forth.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the Internet. This may also or instead include hardware/software for a WiMAX connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability.

Figure 2:
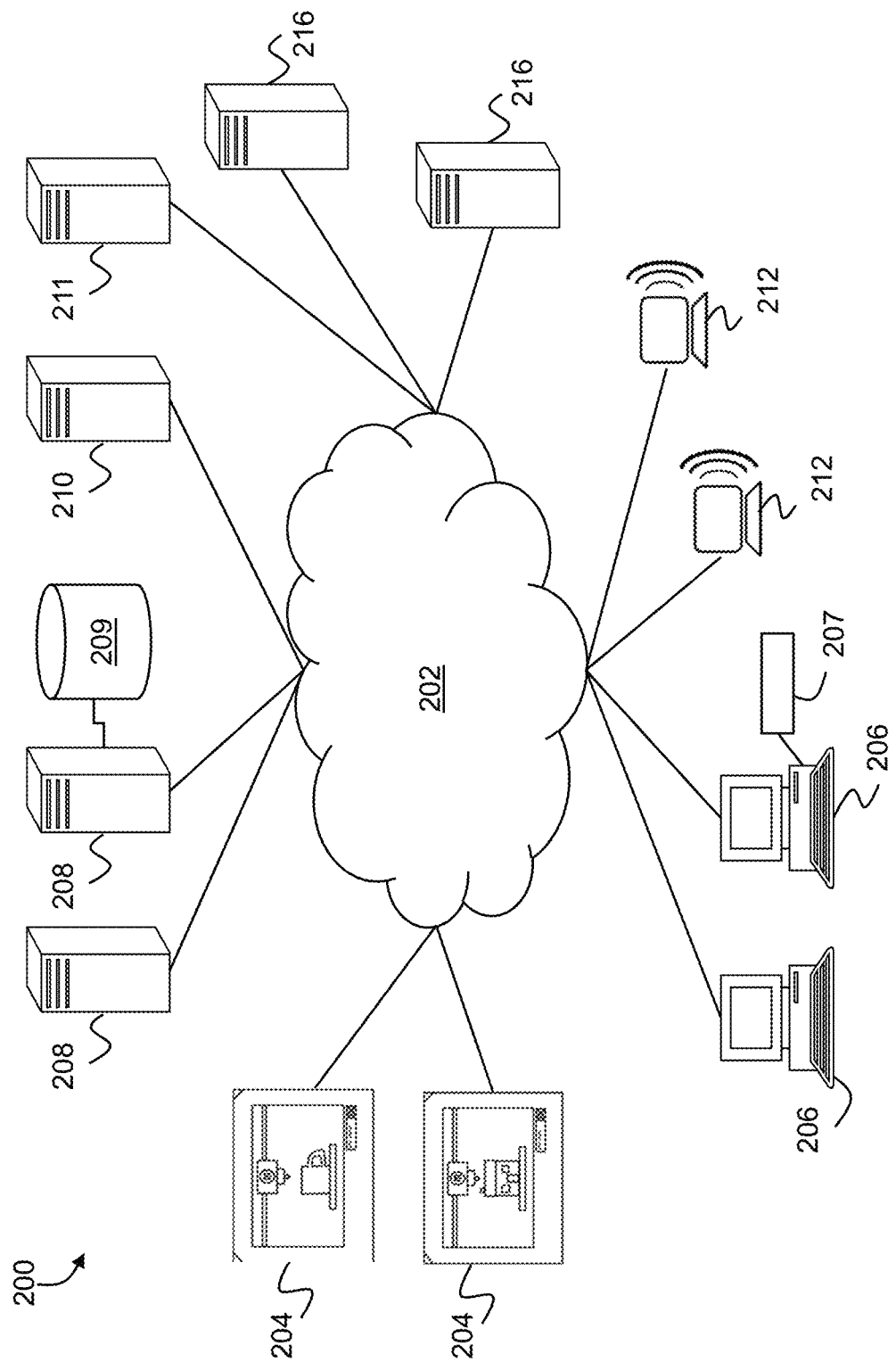
FIG. 2 depicts a networked 3D printing environment.

FIG. 2 depicts a networked 3D printing environment. In general, the environment 200 may include a data network 202 interconnecting a plurality of participating devices in a communicating relationship. The participating devices may, for example, include any number of 3D printers 204 (also referred to interchangeably herein as "printers"), client devices 206, print servers 208, content sources 210, mobile devices 212, and other resources 216.

The data network 202 may be any network(s) or inter-network(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m)) and/or other technologies, as well as any of a variety of corporate area or local area networks and other switches, routers, hubs, gateways, and the like that might be used to carry data among participants in the environment 200.

The 3D printers 204 may be any computer-controlled devices for three-dimensional fabrication, including without limitation any of the 3D printers or other fabrication or prototyping devices described above with reference to FIG. 1. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards (NICs), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network 202.

The printers 204 might be made to fabricate any object, practical or otherwise, that is amenable to fabrication according to each printer's capabilities and its available resources. This may be a model of a house or a tea cup, as depicted, or any other object such as gears or other machine hardware, replications of scanned three-dimensional objects, fanciful works of art, and so forth.

Client devices 206 may be any devices within the environment 200 operated by users to initiate, manage, monitor, or otherwise interact with print jobs at the 3D printers 204. This may include desktop computers, laptop computers, network computers, tablets, or any other computing device that can participate in the environment 200 as contemplated herein. Each client device 206 may generally provide a user interface, which can include a graphical user interface, a text or command line interface, a voice-controlled interface, and/or a gesture-based interface to control operation of remote 3D printers 204. The user interface may be maintained by a locally executing application on one of the client devices 206 that receives data and status information from, e.g., the printers 204 and print servers 208 concerning pending or executing print jobs. The user interface may create a suitable display on the client device 206 for user interaction. In other embodiments, the user interface may be remotely served and presented on one of the client devices 206, such as where a print server 208 or one of the 3D printers 204 includes a web server that provides information through one or more web pages or the like that can be displayed within a web browser or similar client executing on one of the client devices 206. In one aspect, the user interface may include a voice controlled interface that receives spoken commands from a user and/or provides spoken feedback to the user.

A client device 206 may, for example, include a removable memory device 207 such as a USB drive, memory stick, or the like, which may be removably and replaceably coupled to the device 206 and provides memory that can be used for example to transfer digital models of three-dimensional objects to printers 204 or other resources.

The print servers 208 may include data storage, a network interface, and a processor and/or other processing circuitry. In the following description, where the functions or configuration of a print server 208 are described, this is intended to include corresponding functions or configuration (e.g., by programming) of a processor of the print server 208. In general, the print servers 208 (or processors and memories thereof) may perform a variety of processing tasks related to management of networked printing. For example, the print servers 208 may manage print jobs received from one or more of the client devices 206, and provide related supporting functions such as content search and management. A print server 208 may also include a web server that provides web-based access by the client devices 206 to the capabilities of the print server 208. A print server 208 may also communicate periodically with 3D printers 204 in order to obtain status information concerning, e.g., availability of printers and/or the status of particular print jobs, any of which may be subsequently presented to a user through the web server or any other suitable interface. A print server 208 may also maintain a list of available 3D printers 204, and may automatically select one of the 3D printers 204 for a user-submitted print job, or may permit a user to specify a single printer, or a group of preferred printers, for fabricating an object. Where the print server 208 selects the printer automatically, any number of criteria may be used such as geographical proximity, printing capabilities, current print queue, fees (if any) for use of a particular 3D printer 204, and so forth. Where the user specifies criteria, this may similarly include any relevant aspects of 3D printers 204, and may permit use of absolute criteria (e.g., filters) or preferences, which may be weighted preferences or unweighted preferences, any of which may be used by a print server 208 to allocate a print job to a suitable resource.

In one aspect, the print server 208 may be configured to support interactive voice control of one of the printers 204. For example, the print server 208 may be configured to receive a voice signal (e.g., in digitized audio form) from a microphone or other audio input of the printer 204, and to process the voice signal to extract relevant content such as a command for the printer. Where the command is recognized as a print command, the voice signal may be further processed to extract additional context or relevant details. For example, the voice signal may be processed to extract an object identifier that specifies an object for printing, e.g., by filename, file metadata, or semantic content. The voice signal may also be processed to extract a dimensional specification, such as a scale or absolute dimension for an object. The print server 208 may then generate suitable control signals for return to the printer 204 to cause the printer 204 to fabricate the object. Where an error or omission is detected, the print server 208 may return a request for clarification to the printer 204, which may render the request in spoken form through a speaker, or within a user interface of the printer 204 or an associated device.

Other user preferences may be usefully stored at the print server 208 to facilitate autonomous, unsupervised fabrication of content from content sources 210. For example, a print server 208 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, a print queue (which may be a printer-specific or user-specific queue, and which may be hosted at a printer 204, a server 208, or some combination of these) may be managed by a print server 208 according to one or more criteria from a remote user requesting a print job. The print server 208 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 208 and used to automatically direct new content to one or more user-specified ones of the 3D printers 204.

In one aspect, the processor of the print server may be configured to store a plurality of print jobs submitted to the web server in a log and to provide an analysis of print activity based on the log. This may include any type of analysis that might be useful to participants in the environment 200. For example, the analysis may include tracking of the popularity of particular objects, or of particular content sources. The analysis may include tracking of which 3D printers 204 are most popular or least popular, or related statistics such as the average backlog of pending print jobs at a number of the 3D printers 204. The analysis may include success of a particular printer in fabricating a particular model or of a particular printer in completing print jobs generally. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 208.

A print server 208 may also maintain a database 209 of content, along with an interface for users at client devices 206 to search the database 209 and request fabrication of objects in the database 209 using any of the 3D printers 204. Thus, in one aspect, a print server 208 (or any system including the print server 208) may include a database 209 of 3D models, and the print server 208 may act as a server that provides a search engine for locating a particular 3D model in the database 209. The search engine may be a text-based search engine using keyword text queries, plain language queries, and so forth. The search engine may also or instead include an image-based search engine configured to identify 3D models similar to a two-dimensional or three-dimensional image provide by a user.

In another aspect, the printer server 208 may periodically search for suitable content at remote locations on the data network, which content may be retrieved to the database 209, or have its remote location (e.g., a URL or other network location identifier) stored in the database 209. In another aspect, the print server 208 may provide an interface for submission of objects from remote users, along with any suitable metadata such as a title, tags, creator information, descriptive narrative, pictures, recommended printer settings, and so forth. In one aspect, the database 209 may be manually curated according to any desired standards. In another aspect, printable objects in the database 209 may be manually or automatically annotated according to content type, popularity, editorial commentary, and so forth.

The print server 208 may more generally provide a variety of management functions. For example, the print server 204 may store a location of a predetermined alternative 3D printer to execute a print job from a remote user in the event of a failure by the one of the plurality of 3D printers 204. In another aspect, the print server 208 may maintain exclusive control over at least one of the plurality of 3D printers 204, such that other users and/or print servers cannot control the printer. In another aspect, the print server 208 may submit a print job to a first available one of the plurality of 3D printers 204.

In another aspect, a print server 208 may provide an interface for managing subscriptions to sources of content. This may include tools for searching existing subscriptions, locating or specifying new sources, subscribing to sources of content, and so forth. In one aspect, a print server 208 may manage subscriptions and automatically direct new content from these subscriptions to a 3D printer 204 according to any user-specified criteria. Thus, while it is contemplated that a 3D printer 204 may autonomously subscribe to sources of content through a network interface and receive new content directly from such sources, it is also contemplated that this feature may be maintained through a remote resource such as a print server 208.

A print server 208 may maintain print queues for participating 3D printers 204. This approach may advantageously alleviate backlogs at individual printers 204, which may have limited memory capacity for pending print jobs. More generally, a print server 208 may, by communicating with multiple 3D printers 204, obtain a view of utilization of multiple networked resources that permits a more efficient allocation of print jobs than would be possible through simple point-to-point communications among users and printers. Print queues may also be published by a print server 208 so that users can view pending queues for a variety of different 3D printers 204 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 208 may include one or more print jobs for one of the plurality of 3D printers 204. The print queue may be stored locally at the one of the plurality of 3D printers. In another aspect, the print queue may be allocated between the database 209 and a local memory of the 3D printer 204. In another aspect, the print queue may be stored, for example, in the database 209 of the print server 208. As used here, the term 'print queue' is intended to include print data (e.g., the 3D model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 208 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 208 may provide a virtual environment, platform, workspace, or similar for a user. In this virtual environment, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual environment may be, or may include, web-based design tools or a web-based design interface that permits a user to create and modify models. In one aspect, the virtual environment may be deployed on the web, while permitting direct fabrication of a model developed within that environment on a user-specified one of the 3D printers 204, thus enabling a web-based design environment that is directly coupled to one or more fabrication resources.

The content sources 210 may include any sources of content for fabrication with a 3D printer 204. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 210 as contemplated herein. By way of non-limiting example, the content sources 210 may include destinations such as amusement parks, museums, theaters, performance venues, or the like, any of which may provide content related to users who purchase tickets. The content sources 210 may include manufacturers such as automobile, computer, consumer electronics, or home appliance manufacturers, any of which may provide content related to upgrades, maintenance, repair, or other support of existing products that have been purchased. The content sources 210 may include artists or other creative enterprises that sell various works of interest. The content sources 210 may include engineering or architectural firms that provide marketing or advertising pieces to existing or prospective customers. The content sources 210 may include marketing or advertising firms that provide promotional items for clients. More generally, the content sources 210 may be any individual or enterprise that provides single or serial objects for fabrication by the 3D printers 204 described herein.

One or more web servers 211 may provide web-based access to and from any of the other participants in the environment 200. While depicted as a separate network entity, it will be readily appreciated that a web server 211 may be logically or physically associated with one of the other devices described herein, and may, for example, provide a user interface for web access to one of the 3D printers 204, one of the print servers 208 (or databases 209 coupled thereto), one of the content sources 210, or any of the other resources 216 described below in a manner that permits user interaction through the data network 202, e.g., from a client device 206 or mobile device 212.

The mobile devices 212 may be any form of mobile device, such as any wireless, battery-powered device, that might be used to interact with the networked printing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of user-oriented functions such as to locate printable objects, to submit objects for printing, to monitor a personally owned printer, and/or to monitor a pending print job. A mobile device 212 may include location awareness technology such as Global Positioning System (GPS), which may obtain information that can be usefully integrated into a printing operation in a variety of ways. For example, a user may select an object for printing and submit a model of the object to a print server, such as any of the print servers described above. The print server may determine a location of the mobile device 212 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus, a user may be provided with printable content based upon locations that the user has visited, or while within a certain venue such as an amusement park, museum, theater, sports arena, hotel, or the like. Similarly, a matrix barcode such as a QR code may be employed for localization.

The other resources 216 may include any other software or hardware resources that may be usefully employed in networked printing applications as contemplated herein. For example, the other resources 216 may include payment processing servers or platforms used to authorize payment for content subscriptions, content purchases, or printing resources. As another example, the other resources 216 may include social networking platforms that may be used, e.g., to share 3D models and/or fabrication results according to a user's social graph. In another aspect, the other resources 216 may include certificate servers or other security resources for third party verification of identity, encryption or decryption of 3D models, and so forth. In another aspect, the other resources 216 may include online tools for three-dimensional design or modeling, as well as databases of objects, surface textures, build supplies, and so forth. In another aspect, the other resources 216 may include a desktop computer or the like co-located (e.g., on the same local area network with, or directly coupled to through a serial or USB cable) with one of the 3D printers 204. In this case, the other resource 216 may provide supplemental functions for the 3D printer 204 in a networked printing context such as maintaining a print queue or operating a web server for remote interaction with the 3D printer 204. Other resources 216 also include supplemental resources such as 3D scanners, cameras, and post-processing/finishing machines or resources. More generally, any resource that might be usefully integrated into a networked printing environment may be one of the resources 216 as contemplated herein.

Figure 3:
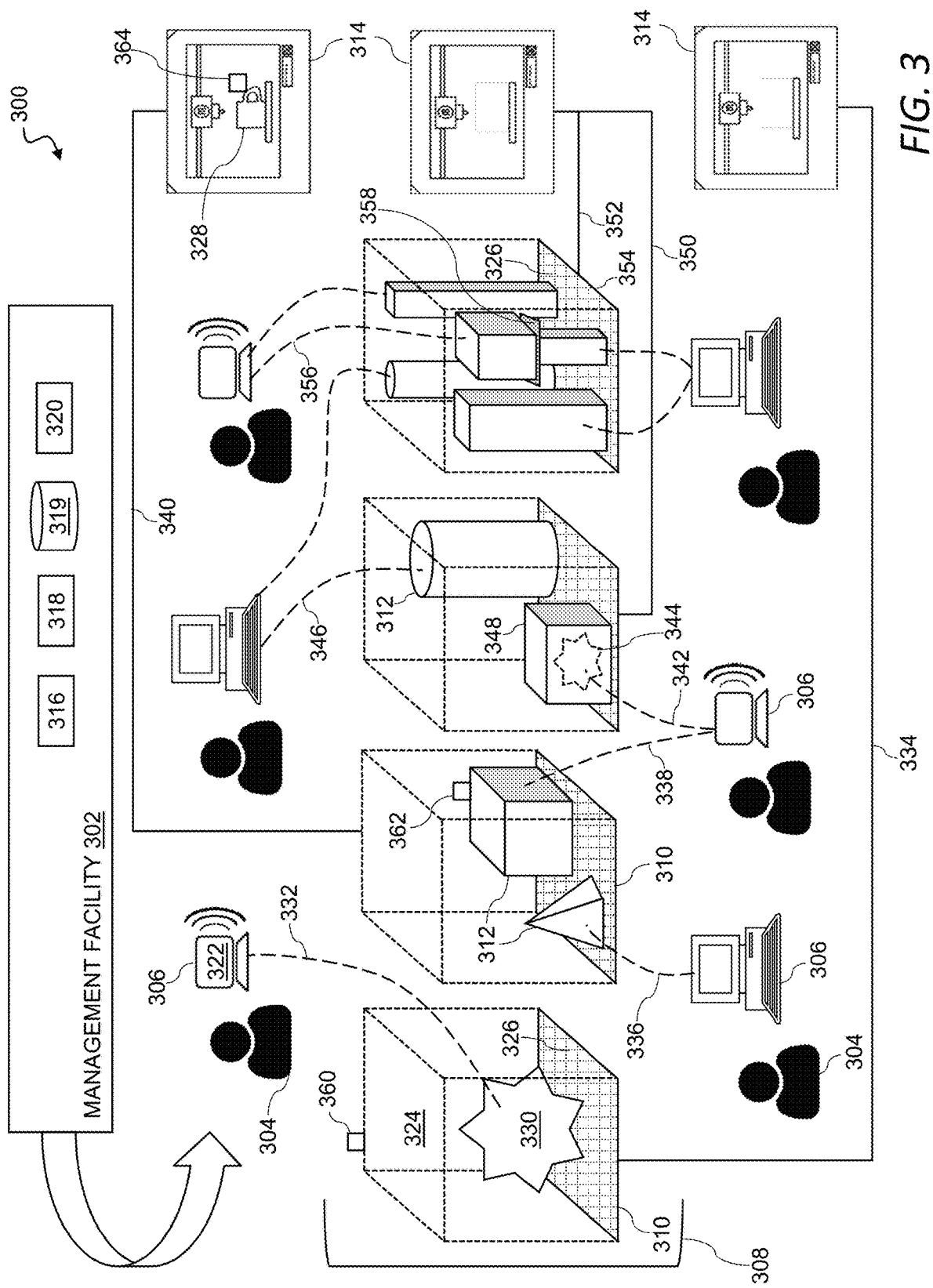
FIG. 3 illustrates a system for multi-user access to fabrication resources.

FIG. 3 illustrates a system for multi-user access to fabrication resources. The system 300 may include a management facility 302, a plurality of 3D printers 314 or similar fabrication resources each having a respective available build volume 324, a plurality of users 304 having user devices 306, and an interactive environment 308 supporting a queue with a plurality of print trays 310 (and more specifically virtual print trays 310) for placement of the computerized models 312 within the available build volume 324 of the printers 314. In general, the system 300 may be configured for the management of multiple computerized models received for fabrication from multiple users through an interactive platform. In general, each print tray 310 provides a virtual representation of the build volume 324 of one or more 3D printers 314. More specifically, each print tray 310 is a virtual representation of a physical print job for printing within a build volume 324, which users may access to position parts for printing before the print tray 310 is submitted for execution as a print job to a physical 3D printer 314. Using the system 300, each user can position one or more of their computerized models to fit within a virtual print tray 310 to pack objects for printing within a build volume 324. The computerized models may instead be automatically positioned within the print tray 310 for efficient fabrication thereof, e.g., based on size, shape, print resolution, color, build material, user location, user access, user preferences, a relationship between different models, and so forth. In another aspect, the system 300 may use a combination of these. In this manner, the system 300 may support semi-automated or computer-assisted model placement. For example, a model may be initially positioned by the system 300 automatically according to any suitable criteria such as user priority, size of object, materials, processing time, and so forth. After this initial placement, a user may override the automatic selection either by repositioning the model within the current print tray 310, or choosing a different print tray 310 within a queue for available fabrication resources. By way of example, in an aspect, model placement can be fully automated for optimal material usage and print time. In another aspect, a user may initiate the automatic arrangement of models by selecting an auto-arrange tool or the like. Similarly, the print trays 310 may be created automatically for arranging computerized models 312 therein, or the creation of print trays 310 may be initiated by a user, e.g., by selecting a tool or checkbox for same. Fabrication resources (e.g., the 3D printers 314) may also or instead be automatically or manually selected for printing the models, e.g., based on properties of the models, availability of the printers or other resources, model or user priority, relationship to other models or objects for fabrication, or any other suitable criterion or combination of criteria.

The management facility 302 may enable the functions of the system 300 and allow for the interaction of the participants/components, e.g., the users 304, the print trays 310, and the 3D printers 314. In general, the management facility 302 may be hosted on a server, virtual server, or other dedicated, virtual, or other resource, which may be hosted locally to one or more printing resources, or remotely in a cloud-based service or other networked computer hosting platform. The management facility 302 may be realized as a computer including a processor, memory, database(s), network interface(s) and so forth consistent with the functions of a locally or remotely hosted resource for managing shared, multi-user access to fabrication resources as contemplated herein. The management facility 302 may be connected to each of the participants/components in the system 300, e.g., via communications interfaces in a networked environment as described above. In general, the management facility 302 may be configured to allow a plurality of users 304 to share, view, edit, copy, search for, and create computerized models 312, as well as communicate with one another for collaboration. In an aspect, the management facility 302 includes a print server or the like that hosts the interactive environment 308 for use by the users 304 through their corresponding user devices 306. The print server may be the same or similar to any of the print servers described above with reference to FIG. 2. The print server may also or instead manage multi-user access to a fabrication resource. In order to perform and enable the functionality as described herein, the management facility 302 may also or instead include a processor 316, a memory 318, a database 319, and one or more software modules 320 as shown in the figure.

The users 304 may include any individuals or entities interested in participating in the system 300, or a select group of users 304. For example, in an aspect, the interactive environment 308 is open to all users 304. In another aspect, the interactive environment 308 is limited or restricted for some users 304, e.g., a customized group of users 304 such as a company's employees. In an aspect, users 304 only have access to certain resources within the interactive environment 308. For example, only certain users 304 might have access to particular machines, particular print trays 310, particular fabrication materials, and so forth. In this manner, the system 300 may allow for the formation of different users 304 having different access rights, which may be allocated individually on a user-by-user basis, to groups of users based on, e.g., role or position within an organization, or some combination of theses. It will be appreciated that in this context, the term "user" may in general refer to an account within the system 300 and associated credentials and information, or the term may refer to an individual who received the account/credentials, or the term may refer to both of these, unless a more specific meaning is explicitly provide or otherwise clear from the context.

Typically, users 304 of the system 300 may include engineers (e.g., industrial engineers, mechanical engineers, design engineers, and so forth), educators, persons associated with the additive manufacturing industry (e.g., print lab operators or managers), computer-aided design (CAD) operators and specialists, computer-aided manufacturing (CAM) operators and specialists, research and development teams, designers, artists, and so forth. The users 304 may include individual persons, groups of people, entities (e.g., corporations, companies, agencies, and so on), automated systems or components, and so forth.

The user devices 306 may include any of the devices described herein including without limitation mobile devices and desktop computers as shown in the figure. The user devices 306 may include user interfaces 322 for the users 304 to participate in the interactive environment 308, e.g., by interacting with the print trays 310, computerized models 312, 3D printers 314, other users 304, and so on.

Each user interface 322 may include a display that shows the interactive environment 308 (or a portion thereof) to the user 304. The user interface 322 may be provided by and/or hosted by the management facility 302, or the user interface 322 may be independent from the management facility 302, e.g., included locally on a user device 306. The user interface 322 may include a CAD or other drawing program for the creation, editing, manipulation, copying, and so forth of a computerized model 312.

The interactive environment 308, which may also be referred to herein as a virtual workspace, a virtual staging area, a shared model workspace, or the like, may generally include a collaborative environment for the plurality of users 304. For example, the interactive environment 308 may include one or more print trays 310 for placement of computerized models 312 therein, e.g., automatically by the management facility 302 or manually by a user 304. The interactive environment 308 may also or instead include other features or tools for the user 304 to support collaborative sharing of print resources. This may, for example, include design tools such as two-dimensional or three-dimensional drawing tools, computer aided design (CAD) tools, design verification tools, visualization or rendering tools, and so forth. This may also or instead include file sharing tools, payment processing tools, design databases, version control systems, and so forth. In another aspect, this may include communication tools such as instant messaging services, screen sharing services, collaborative editing platforms, message boards, social networking platforms, and the like, any of which may be usefully adapted for sharing information about designs and job scheduling as contemplated herein.

Analytics tools may provide information on printer usage, material usage, user statistics, print department usage, group usage, or any other aspects of the print queue, print resource usage, or print management that might be usefully instrumented and presented to users or administrators. The system 300 may also support the creation of reports based on any of the foregoing that can be uploaded to spreadsheets, reports, or documents for inspection or use by the management facility 302, an administrator, or a user 304.

The terms "print tray" and "virtual print tray" as used throughout this disclosure generally refer to a predefined or customizable area or volume of a virtual workspace that corresponds to a physical working area or physical working volume of a fabrication device such as the build volume 324 of a 3D printer 314. In other words, the "print trays" described herein are virtual representations of at least a portion of a physical build volume of a fabrication device. However, the term "print tray" in the art may also refer to a physical object, workspace, tray, build platform, or the like, upon which (or within which) one or more three-dimensional objects is fabricated by a 3D printer 314. Thus, the print tray 310 shown and described in this disclosure with reference to the figures may refer to either a virtual representation of such a physical tray, or the physical tray itself, and all such meanings are intended to fall within the meaning of the term "print tray" unless another meaning is explicitly provided or otherwise clear from the context. By way of example, the print tray 310 may include a virtual representation of a physical platform, tray, substrate, and the like, such as those described in U.S. Pat. No. 7,127,309, which is incorporated by reference herein in its entirety, or any physical realization of such a print tray. In other aspects, the print tray 310 may include a virtual representation of a bed or pool of material for forming an object, e.g., in fabrication devices that include the use of stereolithography, digital light processing, laser sintering, and other similar techniques, or any corresponding physical realization of such a print tray. Additionally, in some aspects, a 3D printer 314 or other fabrication device may include a plurality of physical trays or other build areas, e.g., for printing three-dimensional objects concurrently or sequentially on separate trays or areas, where again each of these physical trays or areas may have a corresponding virtual print tray 310 in a system 300 as described herein.

As stated above, each print tray 310 may correspond to a build volume 324 of one or more 3D printers 314. But the print tray 310 may more generally include any virtual representation of a pending print job at any stage of creation, viewing, management, or execution within a print queue. In general, the print trays 310 may be shaped and sized to correspond to the build volume 324 of a 3D printer 314 and configured to receive and fit one or more computerized models 312 therein. Although shown as conventional rectangular boxed-shaped build volumes typical for a printer using an x-y-z positioning system, it will be understood that this configuration is provided by way of example and not limitation, and that the print trays 310 may include any shape corresponding to the build volume 324 of a particular 3D printer 314 or corresponding robotic control system including without limitation a substantially cylindrical build volume (e.g., having a substantially circular base), a substantially spherical or hemispherical build volume, or any other suitable shape. A base 326 of the print trays 310 may correspond to a build platform of a 3D printer 314. While this base 326 may be physically located at the bottom of a build volume 324, it will be understood that some fabrication techniques such as stereolithography and fused deposition modeling may be inverted, and the base 326 may also or instead be located on the top of the build volume 324 or some other suitable location. Gridlines or other sectioning tools may be included within the base 326 and/or build volume 324 of the print trays 310 to assist users in placing their computerized models 312 therein. The print trays 310 may be viewable by the users 304 at the user devices 306 through the interactive environment 308 that is rendered, e.g., on a display of the user interface 322.

In general, the print trays 310 may be configured to permit editing of computerized models 312 contained therein by multiple users 304. The print trays 310 may be printer specific. For example, a print tray 310 may have specific properties such as a predetermined slice height, infill, and other parameters, where users placing models therein may have to accept these specific properties for the fabrication of objects based on their models. The print trays 310 may instead be non-printer specific.

The computerized models 312 may include 3D models corresponding to three-dimensional objects 328 to be fabricated by the 3D printers 314. The computerized models 312 may include models designed by a user 304, e.g., using design tools provided in the interactive environment 308 or otherwise, or the computerized models 312 may be retrieved by a user 304 from a database or the like (such as any as described herein), e.g., a local database, a database included in the memory 318 of the management facility 302 or in communication with the management facility 302, and so forth.

The interactive environment 308 may be configured to allow for the users 304 to interact with the computerized models 312 on the print trays 310. In an aspect, the users 304 may be able to interact with their own computerized models 312, or another user's computerized models 312. For example, the users 304 may manipulate the computerized models 312 within the print tray 310 in order to, e.g., fit another model within the build volume 324.

The 3D printers 314 may include any of the printers described herein or otherwise known in the art. The 3D printers 314 may include a printer belonging to an individual (e.g., one of the users 304 or otherwise), a shared office printer, printers included in an in-house print shop, printers included as part of an external print service, and so forth, as well as any combination of these printing resources. The 3D printers 314 may be disposed in a single location, or in multiple locations. The 3D printers 314 may include different parameters, resources, specifications, settings, and so forth. Each 3D printer 314 may include permanent features or aspects such as the maximum volume of the build volume 324, maximum extrusion rate or movement rate for a print head, and so forth. In another aspect, various aspects or settings may be set by a user 304, an administrator, or where appropriate, automatically by the system 300 or by an individual printer. For example, a printer may have multiple material sources for printing, e.g., different colors or other physical properties, mechanical properties, or the like, or a printer may be operable at different printer resolutions. All such features may usefully be controlled by a user, or by the system, or some combination of these under a variety of circumstances.

The memory 318 may store instructions executable by the processor 316 for performing tasks of the system 300. For example, the instructions may cause the processor 316 and an associated machine or combination of machines to perform steps such as receiving a first computerized model of a first object for fabrication with a 3D printer 314, positioning the first computerized model on a print tray 310 corresponding to a build volume 324 of the 3D printer 314, receiving a second computerized model of a second object for fabrication with the 3D printer 314, positioning the second computerized model on the print tray 310, processing the first computerized model and the second computerized model in the print tray 310 to create instructions for fabricating the first object and the second object with the 3D printer 314, and transmitting the instructions as a print job for execution by the 3D printer 314.

The database 319 may be the same as or similar to any of the databases described above, e.g., with reference to FIG. 2. The database 319 may be part of the management facility 302 or it may be external to the management facility 302 and remotely accessible through a network or the like. In an aspect, the database 319 stores a print queue of print jobs for use by one or more of the 3D printers 314.

The software modules 320 may include, e.g., a first software module, a second software module, a third software module, and so on. The software modules 320 may be stored in the memory 318 (e.g., of the management facility 302 or print server) where they are executable by the processor 316 to receive a user input of a computerized model 312 into the print queue for fabrication by one or more of the 3D printers 314. One or more of the software modules 320 may also or instead be executable by the processor 316 to combine computerized models 312 with one or more other computerized models 312 for execution as a print job by one or more of the 3D printers 314. One or more of the software modules 320 may also or instead be executable by the processor 316 to provide a user interface 322 for collaborative management of the print job in the print queue by a plurality of users 304.

The plurality of users 304 may be able to view the interactive environment 308 via the user interface 322 of their respective user devices 306. In this manner, the users 304, through interaction with the interactive environment 308, may place, scale, edit, move, remove, parameterize, copy, or otherwise manipulate their computerized models 312 (or, in some instances, other user's models) within one or more print trays 310. To this end, the users 304 can collaborate in a single print tray 310 or multiple trays. Users 304 may also or instead place models on their own, separate print tray 310. In one aspect, some users (e.g., users with elevated privileges) or all users may have an option of locking a particular print tray 310 to prevent access by other users, or to limit access to a particular group or type of user. In another aspect, each user may be strictly limited to manipulation of the user's own models, so that only the user (or where necessary, the management facility 302) can affect the user's models once placed in a print tray 310 in the interactive environment 308. The print trays 310 may be in a queue of print jobs for fabrication on one or more 3D printer 314, e.g., a designated 3D printer 314 or the next available 3D printer 314, or the next available 3D printer 314 having suitable capabilities, or the like. The queue may be prioritized according to the user 304 or administrator, or some combination of these, using tools of the management facility 302 or interactive environment 308 based on, e.g., user privileges, print job ownership, payment for prioritized access, or any other criteria. The queue may instead be automatically prioritized by the system 300, e.g., the processor 316.

Several use cases with regard to the system 300 will now be described by way of example.

In an aspect, a user 304 may have designed (or otherwise obtained) a computerized model 312 (e.g., the first model 330), where the user 304 desires to fabricate an object based on the model. Where the user 304 desires immediate fabrication, or fabrication as soon as possible, the user 304 can place the first model 330 in its own print tray 310 as indicated by the first dashed line 332, and the user 304 can then "lock" the print tray 310 to prevent access by other users, thus facilitating faster fabrication of the first model 330. The user 304 may also or instead prioritize the print tray 310 containing the first model 330 such that it skips any print queue and is sent directly to a 3D printer 314 as indicated by the first solid line 334, where the solid line indicates a print tray 310 (or print instructions related thereto) being transmitted to a 3D printer 314 for fabrication. The print tray 310 containing the first model 330 may be expedited in other ways, such as by the user 304 or the system 300 configuring print settings for a faster print using, e.g., lower resolution or thicker fabrication layers. In an aspect, there may be a cost associated with prioritizing a print tray 310 in such a manner.

As described above, different users 304 may instead collaborate using a single print tray 310, e.g., as indicated by the second dashed line 336 and the third dashed line 338 shown in the figure that illustrate different users placing different computerized models 312 in the same print tray 310. In other words, multiple and/or different computerized models 312 may be placed into a single print tray 310 by multiple, different users 304. The print tray 310 may then be scheduled for printing on a 3D printer 314 as indicated by the second solid line 340 shown in the figure. As depicted in the figure, the print tray 310 may be transmitted as a print job to a 3D printer 314 that is currently available, or to a 3D printer 314 that is fabricating a three-dimensional object 328, in which case the print tray 310 and its contents may be placed into the queue for that printer. In another aspect, the print tray 310 and its contents may be placed into an aggregated queue for a number of different fabrication resources so that the print job can be allocated to a next available printer. The print queue (for a printer, for a group of printers, or for some combination of these) may be displayed for a user 304 within the user interface 322 of a user device 306.

A user 304 may wish to maintain secrecy or privacy with respect to one of the computerized models 312. To this end, and as indicated by the fourth dashed line 342 shown in the figure, a user may conceal a computerized model 312 (e.g., the second model 344) within the print tray 310 from display to other users 304 of the print tray 310. Thus, other users concurrently or subsequently placing a computerized model 312 within the same print tray 310 (as indicated by the fifth dashed line 346) may see a generalized boundary shape such as a convex hull, a spatially low-pass filtered container, or an enclosure with a substantially regular geometry such as a rectangular prism, sphere, or the like. Thus, concealing the second model 344 may include placing a structure 348 around the second model 344 when rendering the second model 344 within a user interface. The structure 348, which may be any of the containers, boundary shapes, or the like described above, may include a virtual structure visible to users 304 of the interactive environment 308 instead of the actual object (e.g., the second model 344), where the second model 344 will be fabricated without the virtual structure. The structure 348 may also or instead include a tangible structure that is fabricated around the second model 344 during a print for an added layer of concealment or privacy. Where a physical container is fabricated, the container may be loosely coupled to the actual structure, e.g., with a raft on the floor of the container to receive the object, or tightly coupled, e.g., by completely obscuring the exterior surface with support structures such as removable or dissolvable support structures that can be removed by the object owner after fabrication is complete. As shown in the figure, the print tray 310 containing the second model 344 may be sent for printing to a 3D printer 314 as indicated by the third solid line 350, where this workspace is placed in a queue for the 3D printer 314 with one or more other workspaces as indicated by the fourth solid line 352. It may be possible for such a queue to be bypassed, e.g., where a user 304 pays an additional fee or asserts a superior access or control right over other users of the queue.

The print trays 310 may be configured (automatically by the system 300 or manually by the users 304 of the system 300) for maximizing efficiency in fabrication of the computerized models 312. For example, as shown by the fourth print tray 354, a plurality of users 304 may place computerized models 312 on a base 326 of the same print tray 354. The users 304 may also stack the computerized models 312, e.g., when it is beneficial to do so. For instance, the fourth print tray 354 contains three taller models and a relatively short model. As indicated by the sixth dashed line 356, a user 304 may place another model on top of a shorter model thereby stacking the computerized models 312. In doing so, the system 300 may automatically generate a raft 358 or other support structure for properly separating and supporting stacked models. The raft 358 may instead be manually generated by a user 304. The stacking may take place before a print tray 310 is sent to a 3D printer 314, or after a print tray 310 is sent to a 3D printer 314. For example, stacking may take place while a print tray 310 is in a queue for a specific 3D printer 314. The stacking may also or instead take place when computerized models 312 are being fabricated by the 3D printer 314, i.e., during a print. This sort of stacking or efficiently fitting designs into print trays 310 may be performed automatically, e.g., by the processor 316 of the management facility 302.

In another aspect, one user may move a model of another user in order to create space within a print tray 310 for another model. For example, where a first model is initially placed in the center of a base or build platform for the print tray 310, a second user may move the model off center to accommodate a second model, or rotate or otherwise manipulate the first model. It is also contemplated that the first user may lock the first model to prevent this type of movement. This may include a general lock (no third-party changes whatsoever) or locking only specific types of changes. For example, where a user wishes a model to be fabricated in a specific orientation relative to the build volume, e.g., where certain fabrication artifacts or the like are anticipated, the user may lock rotation while permitting translation of the model around the base of the workspace. Similarly, rotational locking may include locking of rotation about an x-axis (e.g., where a face of the object remains in contact with the base but the object can rotate about the vertical axis) or rotation about one or more other axes (e.g., where a different face of the object is rotated to be in contact with the base), or some combination of these.

In another aspect, the management facility 302 may move a model of one user in order to create space within the print tray 310 for another model. For example, the system may provide a graphical user interface that supports automatic placement of multiple objects within the print tray 310. Where one or more models are already present within the print tray 310, the system 300 may respond to placement of an additional model (from any user) by rearranging models that are already in the print tray 310 to accommodate the additional content. Where the system 300 cannot locate a suitable arrangement to accommodate the additional model, the system 300 may provide a notification to the user 304 that placed the model, which notification may be supplemented with one or more other recommendations of available print trays 310 within the queue of the interactive environment 308. In another aspect, where a model would fit, but for another model that is locked within the print tray 310 (by the user placing the additional content or by some other user of the print tray 310), the management facility 302 may ask the user 304 if he or she would like to request an unlock from the other user 304. More generally, the system 300 may, through a variety of communication media, support requests among users for changes to the queue including requests for elevated priority, requests to move objects, requests to move locked objects, requests to move objects to other print trays 310, and so forth. Incentives may be offered for granting such requests or other accommodations made by users.

It will be understood that although four print trays are shown in the figure, any number of print trays are possible in the systems 300 contemplated herein (e.g., many more than four). Similarly, any number of computerized models 312 may be placed within a virtual workspace, a print tray 310 (size or other parameters permitting), or a staging area by any number of users 304 for fabrication by one or more of any number of 3D printers 314.

Implementations may also or instead include multiple users 304 collaborating on a single computerized model 312 in one or more print trays 310, e.g., instead of or in addition to multiple users 304 collaborating on multiple computerized models 312 in one or more print trays 310. By way of example, a plurality of users 304 may have collaborated (within the print tray 310 or otherwise) to design the first model 330, to place the first model 330 within the print tray 310 (or components of the first model 330 in one or more print trays 310), to configure settings and parameters for the first model 330, and so on. The users 304 may work together (simultaneously or otherwise) on one or more user interfaces 322 (e.g., each user 304 on a separate user interface 322) within the same interactive environment 308 or otherwise within the system 300.

It will also be understood that the collaborative environment described above may be implemented in a variety of manners. For example, data relating to the interactive environment 308 may be stored in a workspace-centric manner, where each workspace identifies models presently located in the workspace and related parameters such as x-y-z position, rotation, scale, print resolution for the workspace, a target machine to fabricate the print tray 310, a priority for the print tray 310 in a print queue, and so forth. In another aspect, data relating to the interactive environment 308 may be stored in a model-centric manner, where each object is characterized and associated with a particular print tray 310. These and other implementations will be readily appreciated by one of ordinary skill in the art, and any representation or data structure(s) suitable for the uses contemplated herein, e.g., supporting collaborative use of an interactive environment 308 for fabricating objects from models, may be adapted for use with the system 300 described above.

The system 300 may further include features for identifying users 304, print trays 310, computerized models 312, 3D printers 314, and three-dimensional objects 328. For example, within the interactive environment 308, one or more of the print trays 310, the computerized models 312, the 3D printers 314, and so on, may include a first tag 360 that identifies one or more users 304 associated therewith. For example, the first tag 360 on a print tray 310 may include a visual mechanism to show the users 304 viewing the workspace, the users 304 currently using the workspace, an activity log of the workspace (e.g., including actions, timestamps, and so forth), or any other pertinent information regarding the print tray 310. Similarly, a second tag 362 on a computerized model 312 may include a visual mechanism to show a user 304 who created, modified, or moved the computerized model 312, or any other pertinent information regarding the computerized model 312 (e.g., its publisher, a library or database in which it was obtained, and so forth). The first tag 360 and the second tag 362 may thus include virtual tools viewable in the interactive environment 308. A third tag 364 that is physically created by a 3D printer 314 may be used for the three-dimensional objects 328, e.g., to keep track of one or more owners/creators of the three-dimensional objects 328. The third tag 364 may include a physical marking on a three-dimensional object 328, such as a number or tag that is physically printed on the object's geometry, a break-away tag lightly attached to the model, a tag or the like hung around/through an object, a tag printed onto a raft or other underlying structure for the object and so forth. The third tag 364 may include information such as a user's name, a serial number, or other metadata to identify an object. The third tag 364 may be created, modified, or positioned by a user 304, administrator, or operator, e.g., using the interactive environment 308. The third tag 364 may also or instead be created and managed by the management facility 302.

It will be appreciated that a management facility 302 as contemplated herein may be deployed in a variety of contexts. For example, the management facility 302 may be deployed in a shared print facility, such as a print facility for an enterprise or a commercial printing resource available for public use. In deployments such as this, the platform may facilitate shared use of the virtual workspace, e.g., by obfuscating content of other users within one user's graphical user interface, or by managing rights-based access to individual models within a virtual workspace or print tray 310. In another aspect, e.g., in in-house model shop, all print jobs may be manually placed within a virtual workspace or print tray 310 by a human resource manager. In this instance, users may be able to view status and request changes, but access to particular print trays may be limited to the administrator.

Figure 4:
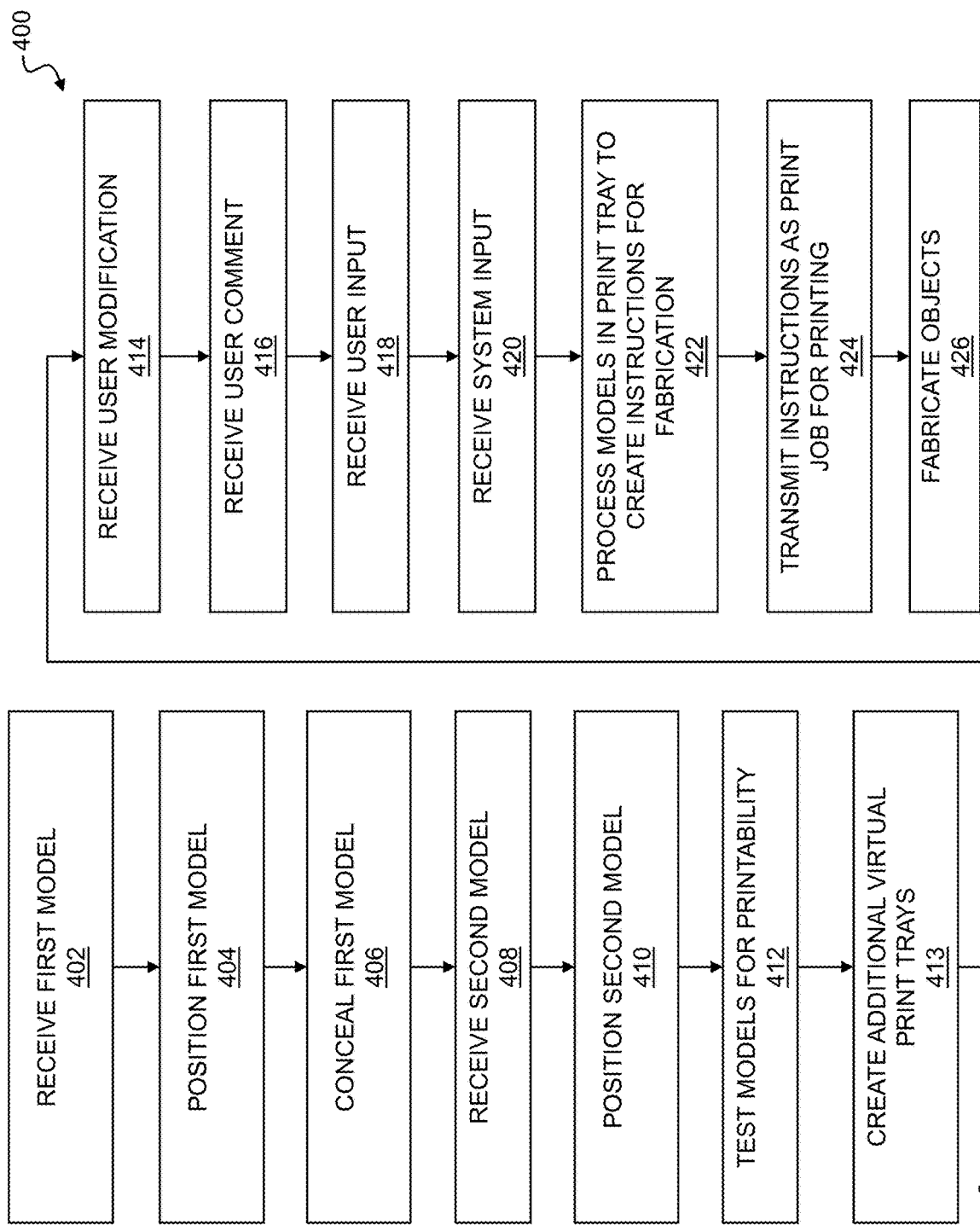
FIG. 4 shows a flowchart of a method for managing multi-user access to a fabrication resource.

FIG. 4 shows a flowchart of a method for managing multi-user access to a fabrication resource. The method 400 may include the use of an interactive environment for multi-user printing, such as the system described above with reference to FIG. 3. In general, using the method 400 as described herein, multiple users may be given partially or completely shared control over computerized models within a virtual workspace or print tray, e.g., to collaborate in placing, annotating, moving, reprioritizing, or otherwise manipulating the models within a virtual workspace or print tray queued (or to be queued) for fabrication by a 3D printer. The method 400 may be implemented by a management facility or the like, such as the management facility described above.

As shown in step 402, the method 400 may include receiving a first computerized model of a first object from a first user for fabrication with a 3D printer. Receiving the first computerized model may include automatically selecting the first computerized model from a queue of objects based on an availability of the 3D printer. That is, users may simply place models in a general queue, and models may be selected from the queue using any suitable prioritization criterial for placement one of the print trays described above. In another aspect, a user may select a specific printer, a specific print tray, and so forth. The first computerized model may be an original model created by a user, or a model provided by a content source or the like, e.g., a model purchased by the user.

It will be appreciated that the interactive environment may be configured for compatibility with multiple types and versions of files including general three-dimensional file formats such as STL or the like, as well as open or proprietary CAD files and the like. In this manner, the system can receive and process native CAD files and assemblies from a variety of sources, where a user imports the CAD files and the system formats the files for subsequent use such as display in a user interface or processing into machine-ready printer instructions.

As shown in step 404, the method 400 may include positioning the first computerized model within a print tray, e.g., a print tray corresponding to a build volume of the 3D printer. As generally described above, this may include receiving manual positioning input from a user, or this may include automatically positioning the model using any suitable algorithms. It will also be appreciated that this step 404 may also or instead include selecting one of a number of print trays in a virtual environment in which to position the model, which may also be manual, automatic, or some combination of these.

As shown in step 406, the method 400 may include concealing a model (e.g., the first computerized model) in the virtual workspace or print tray from display to other users of the virtual workspace or print tray. Where the interactive environment is shared or public, or where a user wishes to conceal content of a model for other reasons while still using the interactive environment to schedule fabrication, the system can support a variety of privacy or secrecy mechanisms to control visual access. For example, where the environment is publicly shared, a user may wish to conceal models from any users not affiliated with a particular company or other institution or juristic entity. Thus, other users from that institution may be able to view the model while the model is concurrently concealed from other users not affiliated with the institution. Thus, the user may employ role-based or group-based management of visual access to a model within the virtual environment. Similarly, the user may employ identity-based management of visual access where particular, individual users are granted permission to view the model. As discussed below, access to the model itself, e.g., for editing or other manipulation, may similarly be controlled so that access to the model can be shared using any constraints desired by the user who provides the model.

Concealing the model may be achieved by enclosing the model in some other shape within the virtual workspace or print tray in order to obfuscate the details of the model. For example, a generic shape may be displayed around the model on the print tray such that the model cannot be seen by others—e.g., a box or other polyhedron, a sphere, a shape generally following the shape and contour of the model but with much less detail, and so forth. It will be appreciated that where this type of obfuscation is employed, there is typically no need to render the interior, obfuscated object. While this is described as displaying a shape around the model, only the obfuscatory shell is required to make other users aware of the object. Thus, displaying a generic shape around a model may include displaying the shell instead of the model. Similarly, with other obfuscation techniques contemplated herein, when rendering an obfuscatory shell or exterior, it is not typically necessary to also render a detailed view of the obscured object. Obfuscation may also or instead be achieved by blurring, blacking-out, or otherwise distorting the model. In an aspect, whatever technique is used to conceal the computerized model in the shared virtual workspace or print tray, the model may maintain its general size or dimensional extremities within the virtual workspace or print tray, such that collaboration with other models in a single workspace is still possible. Also, in an aspect, although a model may be concealed, other users may still be made aware of one or more specifications or parameters for the model, such as material, color, resolution, and so forth, e.g., to promote shared use without revealing the content of the model. In an aspect, the second model (or other models) may not be placed within the same virtual workspace or print tray as a first model until that first model is concealed from viewing by other users.

Concealing the model may also or instead include concealing a physical object printed based on the model. For example, the object may be concealed in a build volume of the 3D printer by fabricating a structure around the object during fabrication of the object such as a box or other shape. In implementations, substantially flat surfaces may be desirous for concealing the model so that other objects can be fabricated on top of the object, e.g., where the top of the structure is used as a raft or other support structure for another three-dimensionally printed object.

As shown in step 408, the method 400 may include receiving a second computerized model of a second object from a second user for fabrication with the 3D printer. In implementations, the second user is different than the first user. For example, the first user may be a member of a design group where the second user is a different member of the design group. In another example, the first and second users may be completely unaffiliated with one another, such as where the users are from two different companies, or where the users are two different independent individuals. In one aspect, the second computerized model may simply be placed into a different print tray where, e.g., the model has inconsistent material requirements, prioritization, spatial requirements, or so forth. Thus, at the threshold, a supervisor process or management facility may automatically determine whether the second computerized model is compatible with the print tray containing the first computerized model.

In an aspect, receiving the second computerized model includes automatically selecting the second computerized model (e.g., from a queue of objects) based on a relationship to the first computerized model. The relationship may include without limitation one or more of a geometric relationship, a relationship among users submitting the first computerized model and the second computerized model, a relationship of the first computerized model and the second computerized model to a multi-part object, a relative priority of the second computerized model to the first computerized model, and so forth. Thus, for example, models for related parts or parts that pack well together within a single print tray may be preferentially selected for a single print tray when possible.

The relationship may be identified by a processor or the like of the management facility, e.g., based upon a similarity of users or computerized models. For example, where a user is an automotive manufacturer and/or the first computerized model is an automotive part, the processor may perform a search for other automotive parts in a related assembly, and so forth. The processor may also or instead be configured to identify related models based upon a social graph of the user. This may, for example, include analyzing a social graph of relationships from the user to identify a common work group, professional affiliation or the like that might suggest locating a number of models in a single virtual environment. For non-professional users or the like, this may also include grouping objects suggesting common interests, geography, or the like to facilitate social interactions among users.

As shown in step 410, the method 400 may include positioning the second computerized model within the print tray. This may be done manually by a user or automatically by the management facility, or some combination of these.

As shown in step 412, the method 400 may include testing a model (e.g., at least one of the first computerized model and the second computerized model) for printability on the 3D printer. In an aspect, each model is tested individually for printability, and then the combination of models contained in the same print tray is tested for printability. Testing for printability may include any of a variety of tests including bridging, water-tightness, structural integrity, feature size, and so forth. In general, this may include static analysis, e.g., by applying various design rules to the model to evaluate minimum feature sizes, horizontal shelves, unsupported bridges and the like for printability. This may also or instead include structural analysis to test, e.g., the structural integrity of the model, or an object fabricated from the model (it being understood that these are two different tests, particularly where the fabrication process introduces structural artifacts such as varying bond strength from layer to layer). Testing for printability may also or instead include determining whether parameters of the models contained in a print tray are compatible with one another or with the configuration of a particular 3D printer. Thus, for example, where particular colors are required, or where dissolvable support materials are requested, or where a particular print resolution is requested, or where other aspects of the model are specified, these may prevent fabrication on one or more available printers in a pool of fabrication resources. Thus, printability may be a binary process (e.g., a model can be printed or cannot be printed) or printability may be a printer-specific evaluation (e.g., a model can only be printed on certain machines).

As shown in step 413, the method 400 may include creating an additional print tray when computerized models do not fit within the same print tray. The additional print tray, e.g., a second print tray, may be created automatically, where computerized models that do not fit within a first print tray are placed on the second print tray. Additional print trays may also or instead be created based on build parameters of objects, materials or resources, and the like. Additional print trays may also or instead be created based on project type or classification—e.g., a user may wish to limit or restrict the comingling of parts from different projects within the same print tray. In an aspect, additional print trays are manually created, e.g., by a user clicking a '+' button or the like.

Techniques and systems that include the automatic creation of additional print trays may be advantageous for users that import or create a plurality of parts for printing, where the plurality of parts will occupy more space than is available in a single print tray, or for users whose parts comprise materials that differ from other parts included on a particular print tray.

When an additional print tray is created, parts from other previously created print trays may be added to the new print tray based on, e.g., material, fit, resources, and the like.

In an aspect, representations of a print tray are displayed for a user in a virtual environment as discussed herein. Representations of the print trays may also or instead be included on other graphical user interfaces of the systems described herein, e.g., as thumbnails that show outlines of print trays, where additionally thumbnails are displayed for each additional print tray created and/or where thumbnails are removed when a print tray is deleted or printed. The user may be able to identify parameters of a print tray using the thumbnails—e.g., by hovering a mouse over a thumbnail a user may see what materials are available for printing using that particular print tray.

Similar to a user's ability to place models in one or more print trays, when an additional print tray is created, a user may move or copy models from an existing print tray to the newly created additional print tray. Thus, in general, a user may be able to move or copy models from one print tray to another. If a user attempts to move a model to a print tray that is incompatible, e.g., because the model will not fit or because of resources available, a user may be alerted of this incompatibility or the model may be automatically moved to a compatible print tray. As stated above, the virtual print trays discussed throughout this disclosure may correspond to a physical tray or other predefined build area for one or more 3D printers. In some aspects, a 3D printer may include a plurality of such physical trays or build areas within its working volume, where each of these trays or build areas may have a counterpart virtual print tray in a virtualized environment as described herein. In such aspects, a user may move a model between virtual print trays that correspond to physical trays included in the same 3D printer. Such movement or edits of models between print trays that correspond to physical trays included in the same 3D printer may also or instead be done automatically, e.g., based on best fit, printing resources, or otherwise.

As shown in step 414, the method 400 may include receiving a user modification, e.g., of one or more of the models in the print tray. The user modification may be applied to at least one of the first computerized model and the second computerized model. The user modification may include one or more of a repositioning of the model, a revision of the model, a rotation of the model, a translation of the model, a scaling of the model, a deletion of the model, a replacement of the model, and so forth. The user modification may also or instead include a modification made to a print tray, e.g., copying a print tray, deleting a print tray, adding a print tray, rotating a print tray, and so on. In an aspect, the user modification is received before the print tray has been allocated to a fabrication resource. In another aspect, the user modification is received after the print tray has been allocated to a fabrication resource. For example, the user modification may be made to adapt the model to a configuration of the allocated fabrication resource such that the model is more compatible with the allocated fabrication resource. In one aspect, the scope of allowable modifications may vary according to whether or not the print tray has been committed for fabrication. For example, once the print tray has been allocated for fabrication, any changes in contents may be prohibited, except for repositioning of objects or removal of a model by the owner (the user who submitted the model for fabrication).

The user modification may be received from the owner of the model, from a second user with other models in the print tray, or by a third user different from the first user and the second user. Each type of user may be permitted different privileges or access rights to make modifications within the print tray. In one aspect, certain users such as administrators or corporate supervisors, may have full control of a model placed by a related user even when the supervisor is not the owner of the model. In another aspect, users that submit models may be prohibited from directly making changes, and may submit requests for changes to an automated or manual review resource (e.g., a model shop manager) for approval and execution.

In an aspect, the user modification may include resizing models so that the models fit within a certain print tray. Such resizing (or any of the other modifications discussed herein) may instead be done automatically. For example, scaling may occur automatically when a user has created a model that is sized such that it does not fit within a certain print tray. Models that do not fit within a single print tray may also or instead be split into multiple parts or components for reassembly after fabrication. In another aspect, scaling a model in one print tray may initiate a corresponding scaling to any related objects (as specified by a user or detected automatically by the system) in other print trays. Similarly, a scaling request may be denied if a corresponding part has already begun fabrication.

As shown in step 416, the method 400 may include receiving a user comment within the interactive environment. The user comment may be accessible to one or more other users of a shared virtual environment that includes one or more print trays as described herein, and the commenter may specify who has access to the comment, either by identity or by user type or affiliation. In an aspect, the interactive environment includes communications platforms (e.g., direct messages, instant messages, group chats, chat rooms, and the like) for the entire interactive environment or for particular print trays. In this manner, users can collaborate with one another through sending comments, suggestions, feedback, pins, identifiers, and so on. The system may also support communications with an operator of a printer or print facility (e.g., one of the resources management by the system) in order to discuss capacity, capabilities or the like, particularly as it relates to pending or planned print jobs.

Comments may be spatially fixed within a print tray or relative to a particular model. In an aspect, a user can provide comments on a specific area of a print tray. For example, a user may place a pin, comment, marker, and the like directly in a designated area in a workspace or attach a comment to a particular feature of a model.

As shown in step 418, the method 400 may include receiving a user input. The user input may be received by a processor or the like that implements the systems and methods described herein, and may in general include any input related to use of the interactive environment as contemplated herein. The user input may be received via a user interface or the like, such as a web page presented to the user on a client device from a web server or other host for the management facility. The user input may include an additional model to be added to the print tray containing the first computerized model and the second computerized model, a modification to a current model, a removal of a model, and so forth. The user input may also include any of the annotations, messages, or the like described herein, which may be received by the system and processed as generally contemplated herein to support collaboration among multiple users and shared use of the print trays and print queue.

The user input may also or instead include a locking of the print tray to prevent further changes. Locking the print tray may also or instead include locking a particular model within the print tray or making a file associated with the model 'read-only.' Locking may also or instead include locking certain print settings (e.g., build material settings, color settings, extruder settings, infill settings or parameters, raft settings or parameters, support settings or parameters, and so forth), while allowing access and modification to others (e.g., position in a specific print tray). Particular components of the model may also or instead be locked instead of locking the model as a whole (e.g., handlebars on a bicycle design can be altered, but the frame may be locked). Settings may be locked globally or for particular models or components. Similarly, locking or unlocking may be specific to a certain set of users, e.g., where a primary user or administrator can still make changes to a model or print tray after locking.

As shown in step 420, the method 400 may include receiving a system input. In general, the management facility may provide a supervisor process for the interactive environment, or for individual print trays within the queue, or for individual fabrication resources, or for any combination of the foregoing. This process may execute on the processor of the management facility described above, a client device for a user, or some combination of these. The process may, for example, monitor the queue of objects for fabrication, the print trays, the fabrication resources and various user interactions to provide instructions for fabrication. For example, a system input from the supervisor process may combine models in the queue into a single print tray, analyze printability of a model when it is placed in a workspace, select a next available fabrication resource for a print tray, respond to a prioritization request from a user, or otherwise manage an end-to-end process from user submission of a model to fabrication of the model using the interactive environment. The system input may for example automatically lock the print tray at a predetermined time before fabrication or offer a more advanced position in the workflow queue to a user or model when working volume in one of the print trays becomes available. More generally, the system input may include any input based on user interactions, status of fabrication resources, content of print trays, or any other aspects of the process that can be monitored and responded to by the management facility.

As shown in step 422, the method 400 may include processing the models in the print tray, e.g., the first computerized model and the second computerized model. Processing the models may include the creation of instructions for fabricating objects, e.g., the first object and the second object, with a 3D printer. This may include g-code or any other machine-ready instructions that can be executed directly by a 3D printer, or any other machine-ready or intermediate representation of the models in the print tray suitable for processing or execution by one of the fabrication resources to fabricate the corresponding objects.

As shown in step 424, the method 400 may include transmitting the instructions as a print job for execution by the 3D printer. This may, for example, include communicating machine-ready code directly to a locally-attached printer or other resource, or this may include transmitting the instructions to a remote printer or a remote print server that can queue the instructions for execution on a particular printer or by a printer from within a pool of available resources. Thus, while the management facility and interactive environment contemplated herein generally contemplates queuing of a number of print trays for execution, it will be appreciated that this queue may also use a remote multi-printer resource such as a physical or virtual print shop to receive print trays. In this context, the remote resource(s) may report queue times and the like so that the management facility can more accurately select remote resources based on availability or time to completion (in addition to other criteria such as cost, location, reputation, printer types, and so forth).

As shown in step 426, the method 400 may include fabricating objects based on the models included in a print tray, e.g., fabricating the first object and the second object in a single fabrication process with the 3D printer.

Figure 5:
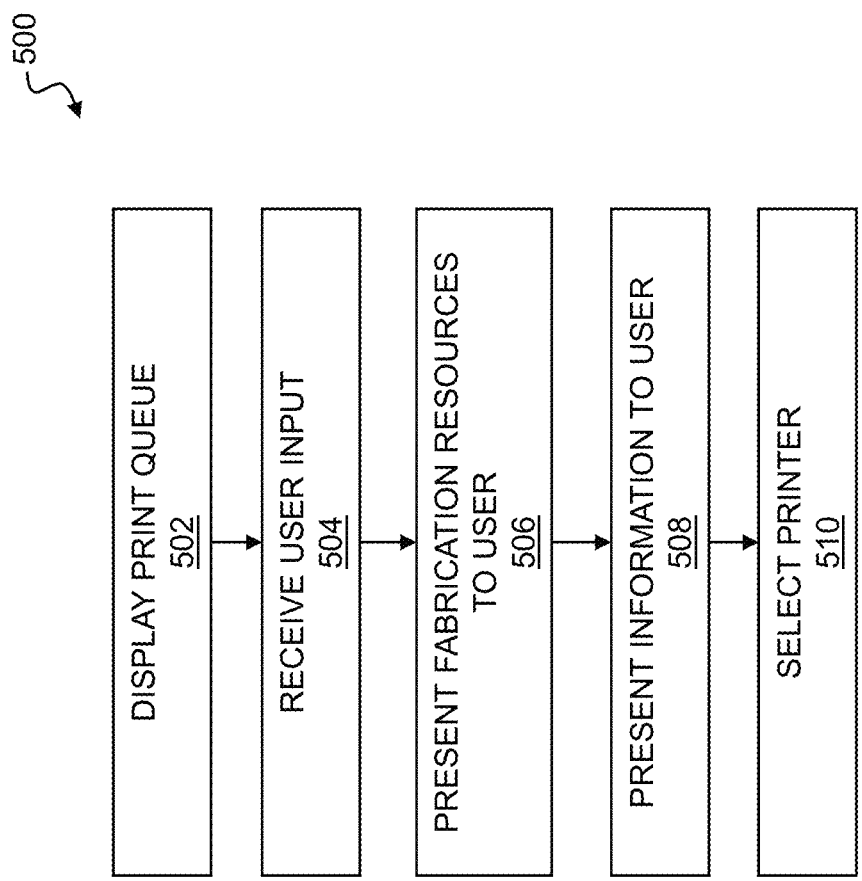
FIG. 5 shows a flowchart of a method for selecting a printer in an interactive environment for multi-user printing.

FIG. 5 shows a flowchart of a method for selecting a printer in an interactive environment for multi-user printing.

As shown in step 502, the method 500 may include displaying a print queue for the 3D printer in a user interface or the like, e.g., on one or more user devices. The print queue may be displayed as a list, a visual representation (e.g., a line of print trays leading to one or more 3D printers), a calendar or schedule, and so forth.

As shown in step 504, the method 500 may include receiving a user input modifying an order of items in the print queue. The user input may be received in the user interface on a user device.

The print queue may be modified based on a prioritization. For example, the systems and methods described herein may permit prioritization using a variety of user-specified criteria. Prioritizing the print queue as contemplated herein may thus include any useful form of prioritization. For example, prioritizing the print queue may include prioritization according to a source of the model or a user. In an aspect, the user or model has an explicit type that specifies their prioritization in the print queue (e.g., whether the user is printing urgent content, commercial or paid content, promotional content, product support content, non-commercial content, etc.). The 3D models themselves may also or instead include a type (e.g., tool, game, home, art, jewelry, replacement part, upgrade part, etc.) or any other metadata, and prioritizing the print queue may include prioritization according to this type and/or metadata.

In one aspect, a processor or the like (e.g., executing a supervisor process for the management facility) may be configured to adjust prioritization based upon a history of fabrication, e.g., when a user exceeds a predetermined threshold. Thus, for example, the number of objects fabricated from a particular user may be limited, giving subsequent priority to models or workspaces from other users. This prevents a single user from overwhelming fabrication resources, such as a local 3D printer in a design shop, in a manner that crowds out other models from other users. In another aspect, different users may receive different prioritization according to organizational role, or priority may be given to commercial users or the like. More generally, any criterion or combination of criteria may be suitably employed to explicitly assign priority or to modify an assigned priority.

As shown in step 506, the method 500 may include presenting a plurality of fabrication resources to a user. The fabrication resources may be presented in a user interface configured to receive a user input of a selection of one of the plurality of fabrication resources to execute the print job. Thus, in an aspect, an option is presented to a user in the user interface to select a fabrication resource for execution of the print job. This may be an initial selection from among a number of printers or printer types, or this may be an option to select a different fabrication resource than that currently assigned for execution of the print job. For example, a user may have a model for fabricating an object in a print tray in a queue for a first 3D printer, but the user may desire for the object to be fabricated by a different fabrication resource, e.g., a second 3D printer that is faster, prints at higher resolution, uses different materials, or is simply available immediately. Any number of factors may influence this decision such as location, network, configuration, print queue length, quality, familiarity, and so on. In an aspect, the different fabrication resources include a second 3D printer sharing a local area network with the first 3D printer. The different fabrication resource may instead include a remote fabrication resource.

As shown in step 508, the method 500 may include presenting information or other features to a user, e.g., in a user interface. The information may include any as discussed herein including information pertaining to an availability or configuration of one or more fabrication resources. The information presented to the user may also or instead include a plurality of quotations from external fabrication resources for execution of the print job. The quotations may include a cost to the user of fabricating the object on each of the external fabrication resources. Such quotations may be automatically presented to the user from external fabrication resources where internal fabrication resources cannot meet the specified criteria for the print job or where significant delays are anticipated for internal resources. The user may, through the user interface, select one of the plurality of quotations and the management facility may respond to the selection by scheduling fabrication of the object with the selected remote resource.

In another aspect, a management facility hosting the interactive environment may automatically recommend a suggested fabrication resource to a user for the print job. The management facility may also or instead automatically suggest a combination of two or more print trays in a print queue for a plurality of fabrication resources or for a particular 3D printer.

As shown in step 510, the method 500 may include selecting a 3D printer from a plurality of printers, e.g., in response to a manual user input to a user interface. The selection of a 3D printer may also or instead be made automatically based on an aspect of one or more of the computerized models included in a print tray. Thus, for example, the selection may be made based on a feature size, a dimension, a print resolution, a color, a build material, and any other characteristics or parameters of a model. The selection may also or instead be based on a user selection made from a group of options that have been chosen for presentation to the user and presented in a suitable user interface.

Figure 6:
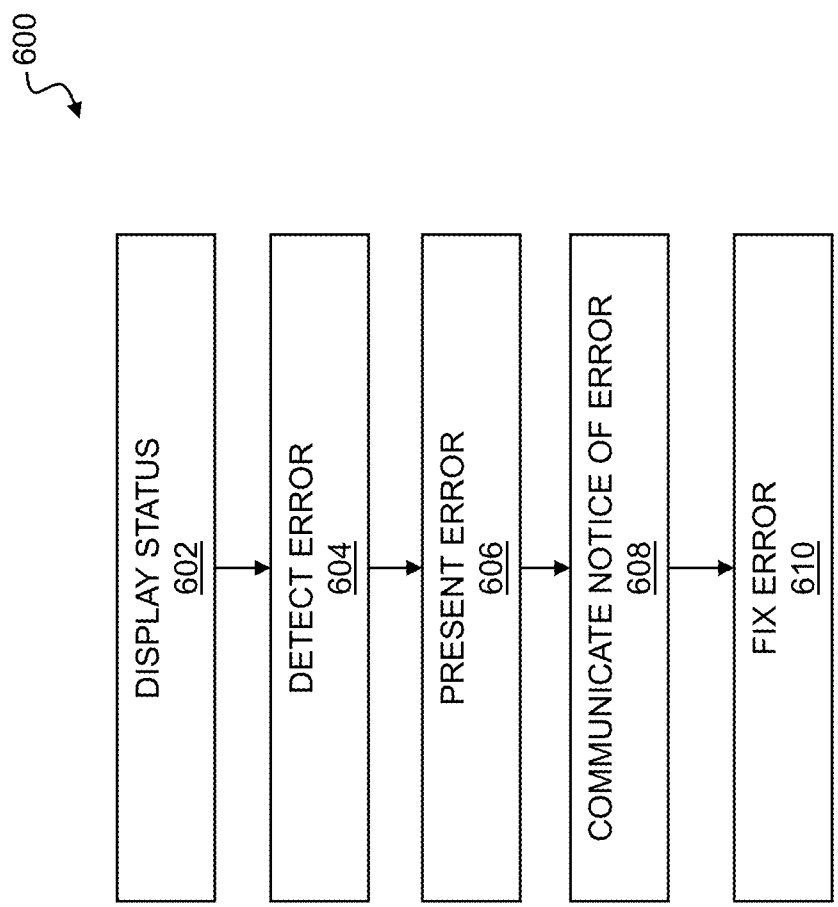
FIG. 6 shows a flowchart of a method for detecting and fixing errors in an interactive environment for multi-user printing.

FIG. 6 shows a flowchart of a method for detecting and fixing errors in an interactive environment for multi-user printing.

As shown in step 602, the method 600 may include displaying a status of the print job, e.g., to one or more users through the user interface. The status may include a textual description of the print job, a visual rendering of a current state of the print job (e.g., completed or in progress), or any combination thereof. This step 602 may also or instead include displaying a print queue for each of a plurality of fabrication resources including the 3D printer in a user interface. Thus, the status of the print job may correspond to the print job's position in a print queue.

As shown in step 604, the method 600 may include detecting an error in the print job. The error may include without limitation one or more of a resource deficiency and a model error. The resource deficiency may occur, for example, when a 3D printer runs out of build material or experiences a mechanical or electrical failure. More generally, the resource deficiency may result from any condition that causes a selected 3D printer to be unable to fabricate the object. For example, the 3D printer may be incompatible with a parameter of the model such as its size, color, resolution, and so forth. This can be caused by a change in the 3D printer's configuration, e.g., where the build material is changed to a different material than that specified for particular models or workspaces, or where the available build material is less than required to complete fabrication of the objects in a print tray.

The model error may also or instead include any design error that renders the model unsuitable for fabrication, e.g., for a selected 3D printer. This may include design errors determined based on static design rules, or on a structural analysis or the like of the object to be fabricated. More generally, any techniques for evaluating whether the selected printer can physically fabricate the desired object may be suitably applied to detect model errors as contemplated herein.

As shown in step 606, the method 600 may include presenting the error to a user. For example, the model error may be presented to a user as an electronic mail, instant message, or notification within a user interface. This may include information for the user to remediate the error, e.g., instructions for a manual intervention to correct the model, select a more suitable printing resource, or take some other corrective action. Digital models may contain a variety of errors that prevent direct fabrication. This may include design rule violations such as horizontal surfaces bridging excessive distances, as well as non-manifold errors, mixed normal errors, self-intersections and other mesh errors and the like. Some errors such as unexpected surface holes may be automatically detected and repaired, and others may require user intervention, either to address the deficiency or revise the model to avoid a limitation imposed by a design rule. In general, these errors may be presented to the user along with options for repair and/or a selection of automated repair options where appropriate.

As shown in step 608, the method 600 may also or instead include communicating a notice of the error, e.g., to an owner of a model that contains the error, or some other related user. It will be noted that the two steps (606 and 608) may occur concurrently or sequentially, or in certain circumstances one or both steps may be omitted entirely, particularly where a model contains no errors or where the errors can be automatically detected and unambiguously repaired. However, where a user is logged into the interactive environment described above, notifications of errors may be presented to a user in the interface as described in step 606. By contrast, where a user is not logged in, or where a user is not responding to a presentation of the error, additional communication channels may be employed to warn the user that a scheduled print job might be skipped or might result in fabrication errors. The notice may be communicated via the user interface or through known communication techniques such as push notifications, text messages, electronic mail, and so forth. The notification may include an alert, e.g., a sensory alert such as a visual display, an audible sound, or a vibration.

As shown in step 610, the method 600 may include fixing the error. For example, in an aspect the management facility or the like automatically fixes the model error. The error may instead be manually corrected, e.g., by the user or an administrator, all as generally described above.

The methods described herein may be implemented on a computer program product for managing multi-user access to a fabrication resource. The computer program product may include computer executable code embodied in a non-transitory computer readable medium that, when executing on one or more computing devices, performs the steps of the various methods described herein. In one aspect, a print server or the like implements one or more of the steps of the methods described herein, and provides a corresponding user interface for related user interactions.

Figure 7:
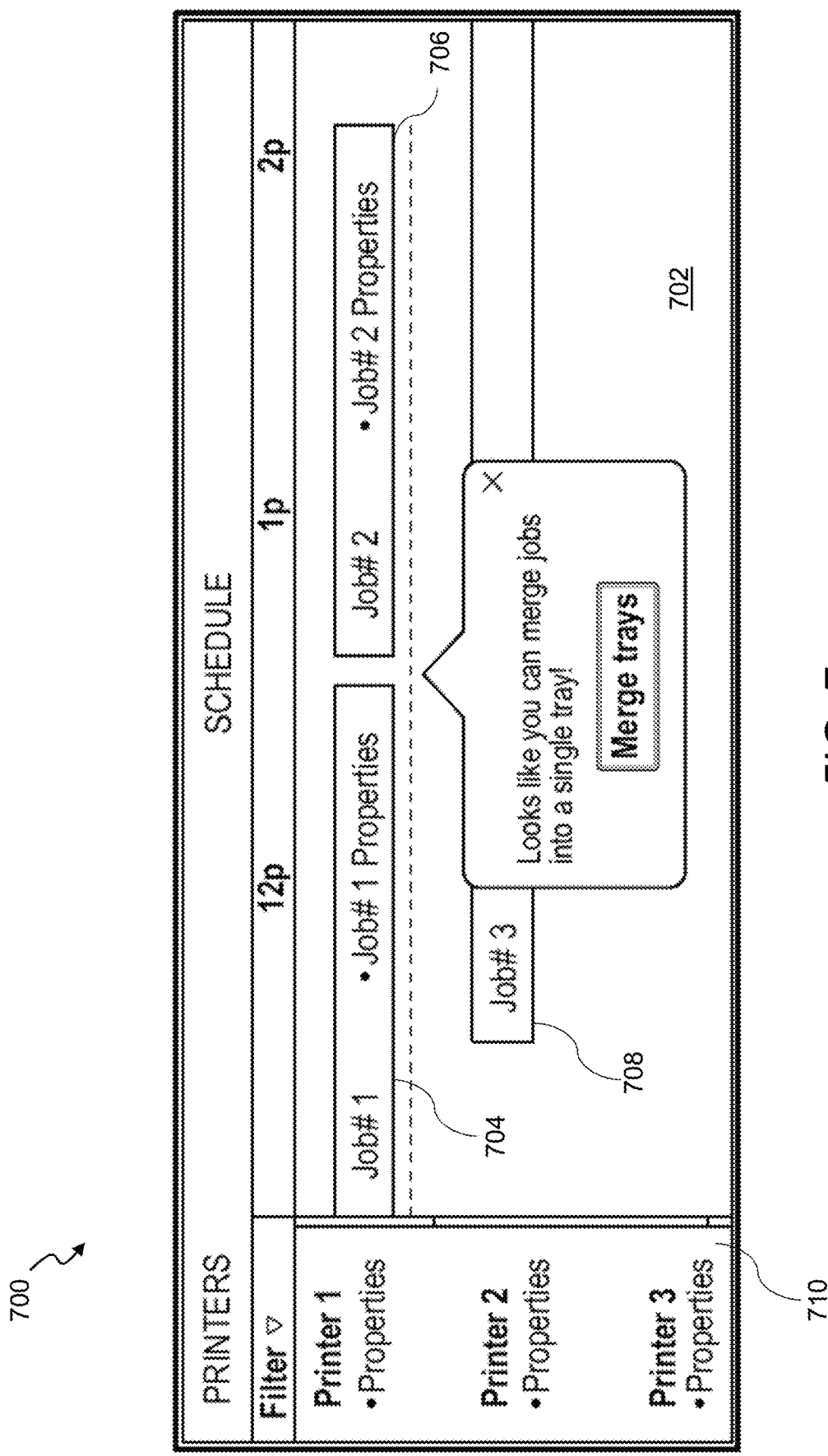
FIG. 7 shows an example of a user interface having a calendar.

FIG. 7 shows an example of a user interface for multi-user access to fabrication resources. The user interface 700 may provide a variety of tools for managing print jobs in the interactive environment. The user interface 700 may be utilized in any of the networked environments described herein including without limitation an online platform or a local area network.

The user interface 700 may, for example, include a calendar, schedule, or similar time-based arrangement of information. In this manner, the online platform may provide a calendar interface 702 that allows a user to schedule print jobs in a visually intuitive manner. The online platform may also or instead be configured to merge multiple print jobs that were originally scheduled separately or that were included on separate print trays, into a single workspace. An example of this is shown in the figure where a first print job 704 and a second print job 706 are merged into a third print job 708. This may include merging compatible print jobs into a single print job where possible, e.g., because of available space, available materials, similarities in printing properties or parameters, similarities in geometric features, and so on. Merging compatible print jobs may be performed manually by a user or automatically by a processor of the system.

The user interface 700 may also or instead provide a status for all printers in a system, and/or list the properties of all printers in a system, e.g., in a printer window 710 of the user interface 700. This can be useful for implementations where a user has the ability to move print jobs between printers, combine compatible print jobs into a single print tray for a printer, schedule maintenance for a printer, and so on. While a calendar is one useful visual metaphor for scheduling, other visual metaphors may also usefully be employed. For example, the user interface 700 may render a sequence of print trays (e.g., similar to FIG. 3), including renderings of current contents (e.g., models) therein, along with annotations or the like showing whether and where each workspace is scheduled for production. More generally, any arrangement of information useful for visualizing in-progress print jobs, content of print trays, and the like, and for receiving user interactions with the queue from multiple users, may be usefully employed as a user interface 700 as contemplated herein.

In one aspect, the user interface 700 may support a variety of scheduling features. By way of example, a user may attempt to schedule a print job on an in-house fabrication resource located down the hall from a user's physical workspace, but the in-house resource may be booked or otherwise unavailable for the user's print job. Upon learning of the in-house resource's unavailability, the user may schedule an alternate resource for the user's print job. For example, a user may be affiliated with a company that has a print shop on another floor of the user's building. Instead of requiring the user to export the prepared print tray to the print shop (e.g., via a thumb drive or the like, or otherwise electronically transmitting a file), the user may access the online platform through their browser and create a print request by selecting the alternate fabrication resource, e.g., the print shop on another floor. Alternatively, the user can select another fabrication resource completely unaffiliated with the user, e.g., a manufacturing bureau run by an external company or the like (e.g., an external print shop). When the user selects the external print shop, the online platform may display a price quote and a delivery estimate for the user, so the user can simply click "Buy" and have the printed object delivered to the user in accordance with the delivery estimate. The price quote from the online platform may utilize one or more of the features described in U.S. Pat. No. 8,818,544, which is hereby incorporated by reference in its entirety. The online platform may also or instead recommend a print destination, e.g., based on cost, quality, time, settings (e.g., if a default printer set by the user is not configured to print a particular model or workspace, the system may automatically recommend another printer), geographic location and so forth. A user may be able to prioritize these factors, e.g., using control sliders or the like.

In one aspect, the user interface 700 may provide an error checking tool as contemplated above. In another aspect, the user interface 700 may provide a slicer algorithm that can convert a collection of models in a print tray into machine-ready instructions. This algorithm may be deployed when a particular printer is selected for a print tray (or when the type of printer can otherwise be determined with certainty). At this point, machine-ready instructions can be accurately generated for the target printer. Error checking may be distributed, such as by fixing inherent model defects immediately, while applying process-specific or machine-specific design rules once the specific printer (or type of printer) is selected.

The user interface 700 may provide a color printing tool. This tool may support multi-color or full color 3D printing, where the processor determines how to map a full color image to the color options available on a particular 3D printer. To this end, a user can upload a full color image for analysis by the processor. Instructions for a print may then be created that adapts the full color image to the physical limitations of a printer. For example, the processor may map the full color image to a specific gamut of colors that are available for a printer, or the processor may attempt to control transitions between different colors in a continuous build media in a manner that minimizes transition artifacts.

The user interface 700 may support management and use of an in-house print shop where requests, print preparation, and print job scheduling can be coordinated on one platform through a responsive web interface having features as discussed herein. The user interface 700 may also or instead support shared use of a single printing resource such as a standalone printer. In another aspect, the user interface 700 may support use of remote resource including commercial printing services and the like, either alone or in combination with other fabrication resources contemplated herein. In-progress jobs may be viewed anywhere. Thus, no matter where a job from a user originates (e.g., a desktop computer, a mobile device, a workbench, a thumb drive on a 3D printer, and so forth) and no matter where a user transmits a job (e.g., a local 3D printer, a shared 3D printer, a printing bureau, and so forth), the status of the job may be available to a user everywhere (e.g., on mobile device, through a widget, on a desktop computer, and so forth).

In one aspect, the user interface 700 may incorporate a design environment, such as a web-based CAD platform or the like that users can employ to modify designs and submit designs or components of a design to printing resources. This may facilitate drag-and-drop fabrication of a complete, multi-part CAD design. A user may also or instead be able to select portions of an assembly and print only those portions. This functionality may be supplemented by coordinated scheduling. For example, the components of a single CAD design may be arranged in a single print tray. In the case where multiple workspaces are required for the components of a CAD design, the components may be arranged into multiple workspaces and queued for fabrication by a single printer or a number of co-located printers. More generally, the user interface 700 may provide tools for model design, print previews, file repairs, topology optimization, size optimization (e.g., to fit the models in a build volume), hollowing, compensation for build flaws (e.g., shrinking, curling, and so on), surface texturing, optimized grouping, material selection, nesting, coloring, smoothing, contouring, multi-platform support, mesh repair, and so forth. In one aspect, the user interface 700 may provide complementary features, such as decomposition of large objects into a number of smaller, interlocking objects that can be fabricated independently and then assembled into the large object.

The user interface 700 may include a variety of tools to facilitate user interaction with digital content in the queue (e.g., computer models positioned within the print trays or in a queue for placement in the print trays). For example, the user interface 700 may include print settings for selection or specification by a user. Other possible tools include tools to manipulate models within the print tray(s). In one aspect, the features include orientation options. The orientation options may allow a user to orient a model within a print tray. The orientation options may also or instead include an automatic orientation feature that orients models within a print tray, e.g., based on support, size, resolution, quality, speed, strength, and so forth. The features may also or instead include options for users to select materials, resolutions, strength, quality, and so forth. Users may also or instead be permitted to provide parameters for toolpath generation, such as by setting a number of contour shells in a printed object, layer height, in-fill patterns, in-fill density, and so forth.

The user interface 700 may provide a photorealistic rendering mode that shows how the model will look when printed. The rendering may include support structures such as rafts and the like, as well as other features such as striations, surface textures and finish, and the like, or the rendering may omit some or all of these ancillary structures. The renderings may show surface finishes such as matte surfaces versus glossy surfaces. The rendering may be created using information pertaining to light sources (e.g., virtual lighting of the rendered model), layer heights, toolpaths, orientations, tessellations, colors, and so on. In another aspect, a toolpath for a model can be shown to a user within the user interface 700.

The user interface 700 may provide tools for control of other print parameters or settings so that a user can ensure that a printed object is completed in a predetermined timeframe or according to other user-selected constraints. In another aspect, a processor can automatically determine these parameters based on a predetermined timeframe or a user-specified timeframe. For example, in an aspect, the user simply selects an 'end time' for the print, and the processor calculates parameters such as pauses, infill, layer heights, and so forth to ensure that the object is completed by the selected end time. Other parameters affecting the time of a print can be specified such as material, resolution, size, and so on.

Figure 8:
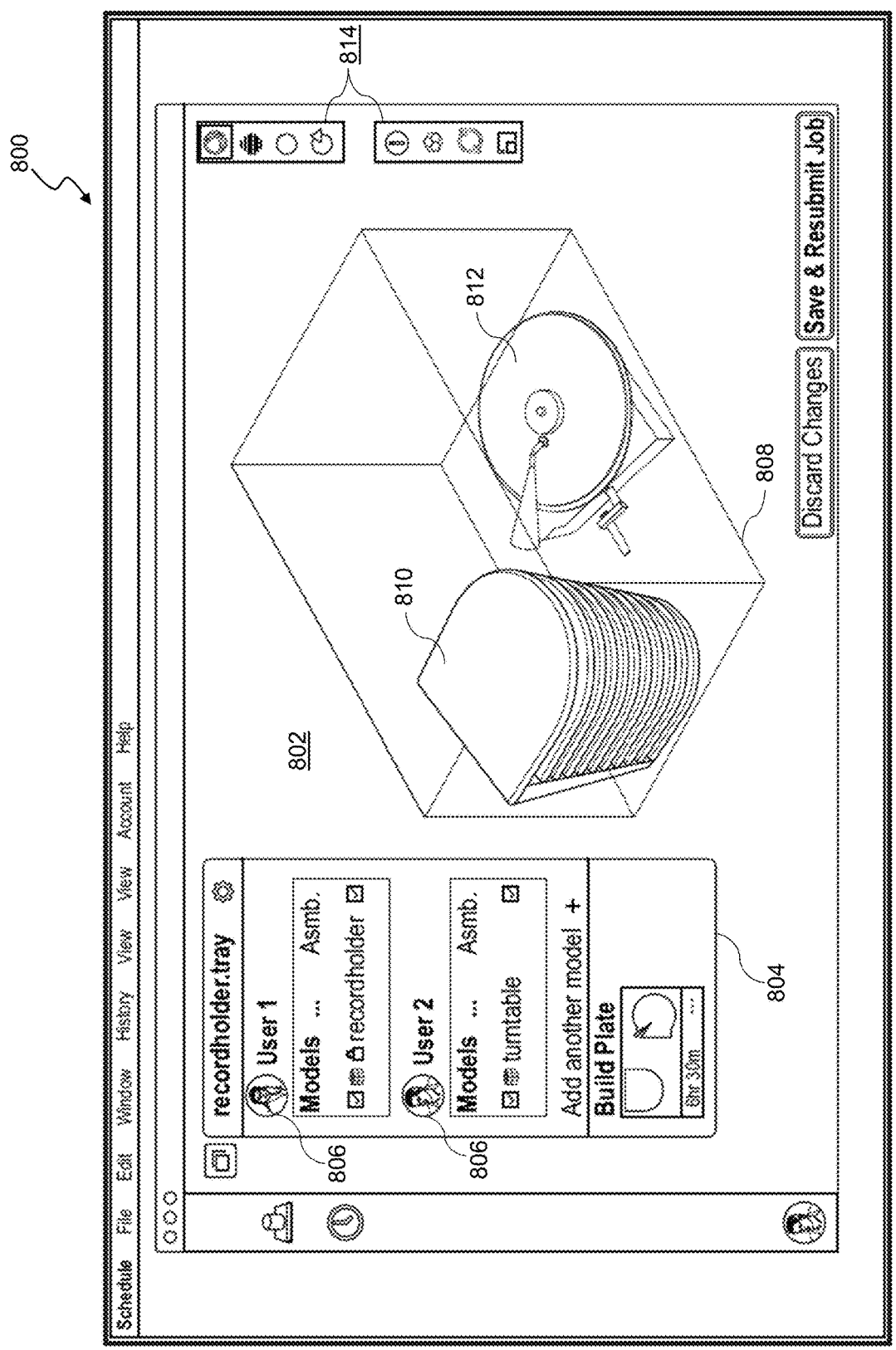
FIG. 8 shows an example of a user interface for collaborative design.

FIG. 8 shows an example of a user interface for collaborative design. The user interface 800 may be created from or displayed on any of the devices and systems described herein, e.g., in a platform for multi-user access to fabrication resources such as 3D printers. The user interface 800 may include a display 802 having a window 804 or the like for showing one or more users 806 working in the same build tray (or trays) of a collaborative virtual environment. For example, as shown in the figure, a first user may place a first model 810 within the print tray 808 and a second user may place a second model 812 within the print tray 808. The first model 810 and the second model 812 may be related—e.g., components of a disk changer including a record holder and turntable are shown in the figure. Alternatively, the first model 810 and the second model 812 may be unrelated.

Each of the users 806 may collaborate by modifying, moving, removing, manipulating, and so forth, one or more of the models within the print tray 808. The user interface 800 may further include tools 814, such as CAD tools and the like, for use in the collaborative virtual environment. As further described herein, a user's ability to modify another user's model may depend on the relationship between the two users, including whether one user has explicitly granted corresponding rights to the other user, whether they belong to a common group of users, or whether they have an appropriate relationship to one another within a corporate entity or the like. Thus, the system may support identity-based access to models of other users, depending on the existing of implicit or explicit rights to modify content from other entities that are using a print tray 808.

Figure 9:
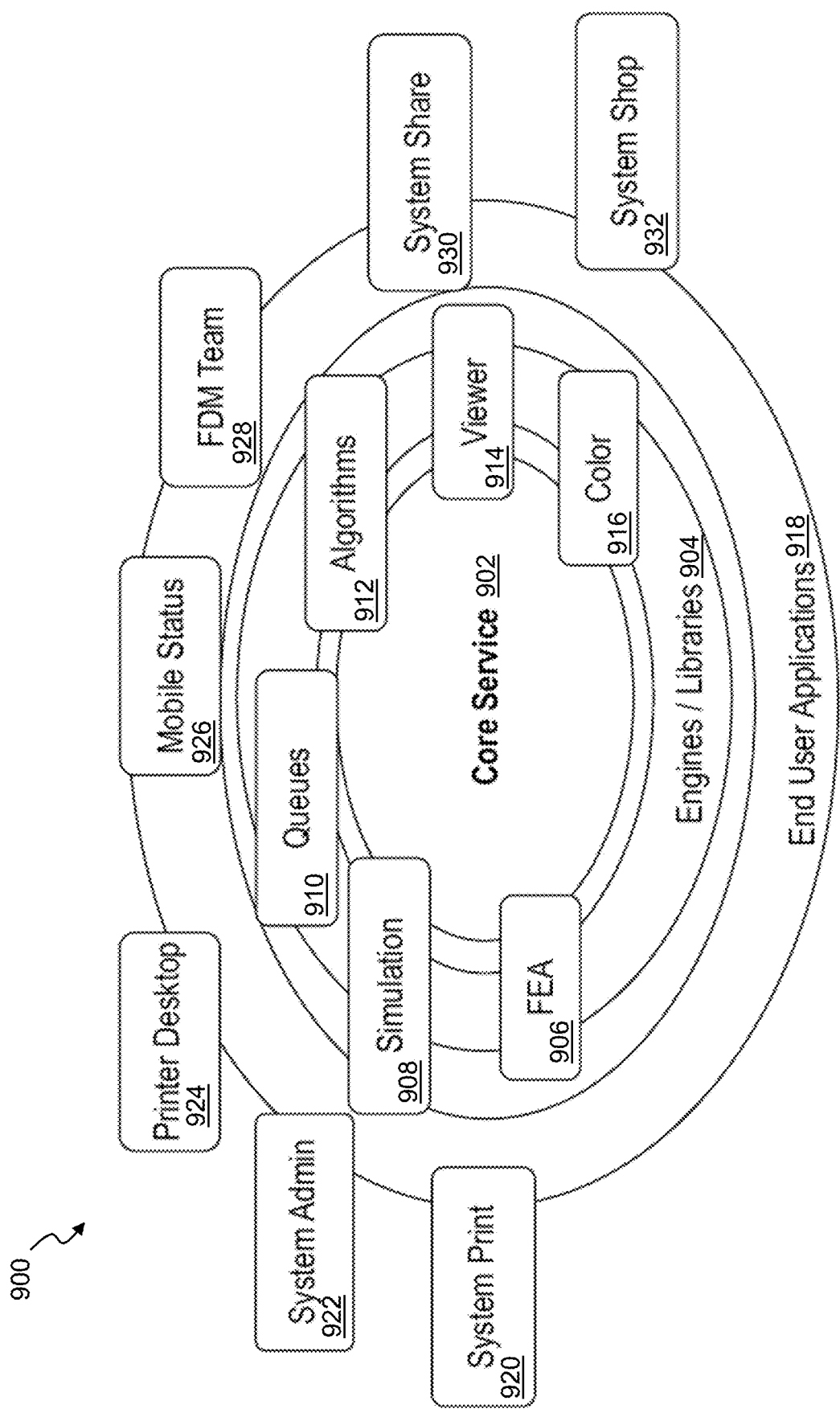
FIG. 9 illustrates a resource environment for multi-user access to fabrication resources.

FIG. 9 illustrates a resource environment for shared fabrication resources. As generally depicted in FIG. 9, the resource environment 900 may include a number of core services 902. The core services 902 may include one or more of model storage, CAD platforms, fabrication resources, and the like, and may be provided using propriety platforms or any of a variety of commercially available alternatives.

A number of supplemental services 904 (shown as "Engines/Libraries" in the figure) such as engines, libraries, software modules or the like may supplement these core services 902 to provide enhanced user functionality. This may include, e.g., mechanical or physical simulation tools, finite element analysis (FEA) tools 906 or other solid modeling, simulation 908, or similar design analysis tools. This may also include external printer queue management systems 910, one or more algorithms 912 for performing functions described herein, model viewers 914, special purpose model tools, e.g., for multi-material, multi-color support 916 and the like, and so forth. Any other discrete processing tools may be provided in this environment.

All of the above may be combined and presented in a user interface (such as any of the user interfaces described above) as individual end user applications 918, or as a single end user application to access and use remote and local printing services 920 (shown as "System Print" in the figure), administrative tools 922 (shown as "System Admin" in the figure), control and management of a single desktop printer 924, receive status updates 926 (shown as "Mobile Status" in the figure), software tools for management of connected or networked printers 928, such as the FDM Team™ software offered by Stratasys, Inc. of Eden Prairie, Minn., sharing tools 930 (shown as "System Share" in the figure), collaborative, social networking platforms, shopping tools 932 (shown as "System Shop" in the figure) including shopping for models and shopping for design services, printing resources, and the like, and so forth. Similarly, a mobile interface or the like may be provided for access by smart phones, tablets, and other similar endpoints. Other ancillary services such as payment processing, messaging and communications, and so forth may also be integrated as desired to provide a seamless work environment for shared use of fabrication resources.

Figure 10:
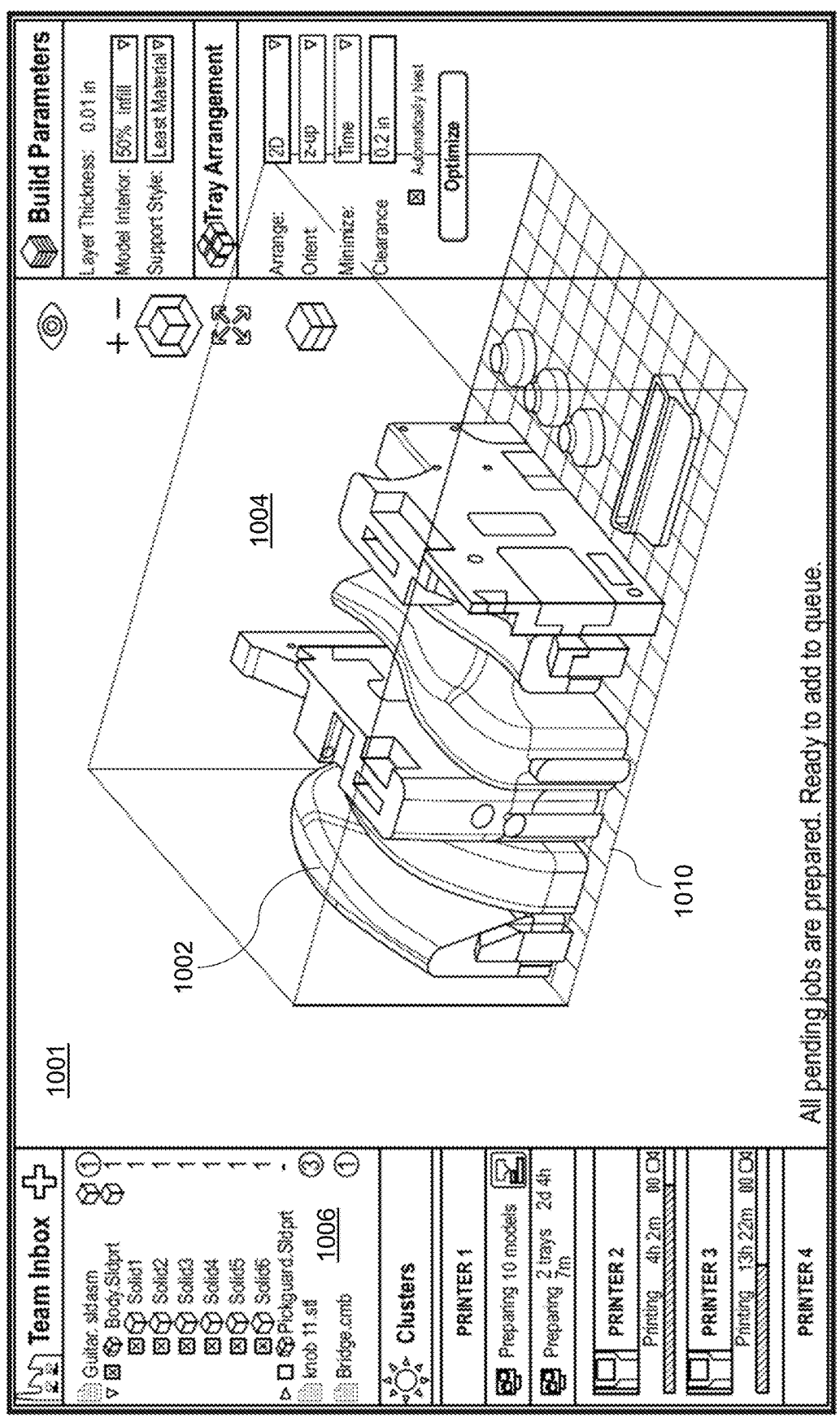
FIG. 10 shows an example of a shared model space.

FIG. 10 shows an example of a shared model space. The shared model space 1000 can include a virtual staging area 1001 for placing 3D models 1002 on a print tray 1010 within a virtual environment 1004 before being queued for printing. In this manner, the virtual staging area 1001 acts as a shared inbox or the like, e.g., for users having access rights to such an inbox (e.g., users working in the same design group/research and development team in a company) and offering one or more print trays 1010 for printing on one or more printers. In an aspect, users with special access rights can view the virtual staging area 1001 and print trays 1010, edit the 3D models 1002, place 3D models 1002 on print trays 1010 for being sent to a 3D printer, and the like. As such, the shared model space 1000 can be particularly useful as a shared workspace for users to place 3D models 1002 on print trays 1010 before the print trays 1010 are queued for fabrication. In an aspect, a processor automatically places incoming 3D models 1002 on print trays 1010 in the virtual staging area 1001, for example allowing various members of a design team to review and modify the contents.

The shared model space 1000 may include a list 1006 of the 3D models 1002 placed on one or more print trays 1010. In an aspect, selecting a model from this list 1006 (e.g., by touching the model on a touchscreen display, by a mouse-click, by hovering a mouse over the model on the list, or the like) may present a visual indicator for the 3D model 1002 on a print tray 1010—e.g., selecting a model from the list 1006 may cause the 3D model 1002 to become highlighted or otherwise visually marked within a print tray 1010 for easy identification by a user. Similarly, in an aspect, selecting a 3D model 1002 within the staging area 1001 may present a visual indicator for the 3D model 1002 in the list 1006. For example, selecting a 3D model 1002 within staging area 1001 may cause the name of the model contained in the list 1006 to become highlighted or otherwise visually marked for easy identification by a user. The list 1006 may include an expandable tree or the like that includes parts and sub-parts for a project or the like. In an aspect, parts in the list 1006 that are included in the virtual staging area 1001 being viewed by a user may be highlighted, bolded, or the like, and parts in the list 1006 that are not included in the staging area 1001 being viewed by the user may be faded, grayed, or the like. Other visual indicators are also or instead possible. In an aspect, a user may be alerted by a visual indicator as to parts in the list 1006 that are not included in any print tray 1010 within the staging area 1001, such that the user can place these parts on a print tray 1010 for printing.

Figure 11:
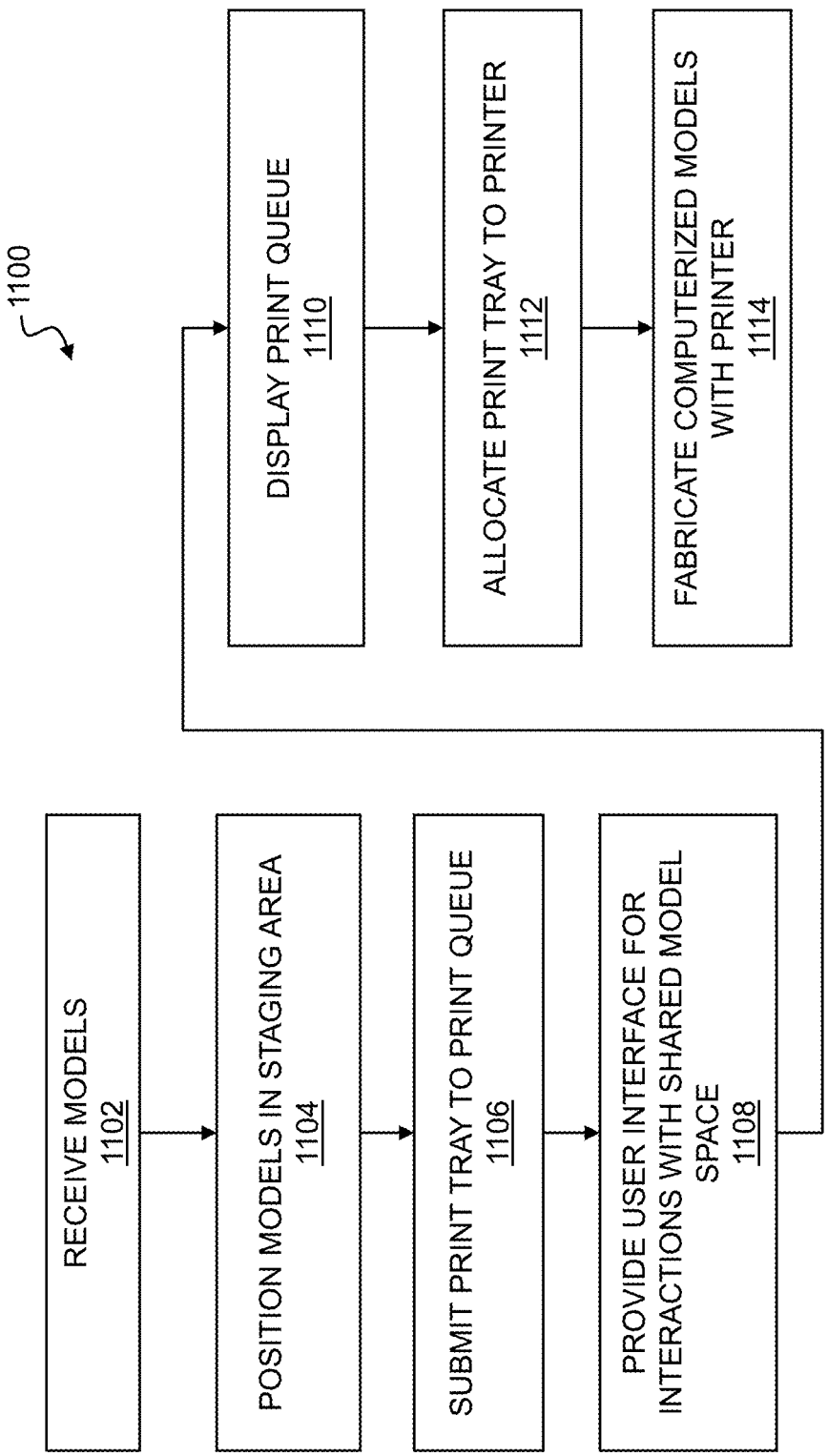
FIG. 11 shows a flowchart of a method for managing multi-user access to fabrication resources.

FIG. 11 shows a method for managing multi-user access to fabrication resources. In general, the fabrication resources may be any of the 3D printers or other fabrication resources described herein, and multi-user access may be managed using a management facility and the other systems and methods described above. In the following description, the term "computerized model" or the like generally refers to a computer representation of an object in any suitable computerized form unless otherwise stated or clear from the context. The term "object" or the like generally refers to a conceptual object upon which the computerized representation is based or a physical object that is fabricated from the computerized representation unless otherwise stated or clear from the context.

As shown in step 1102, the method 1100 may begin with receiving a plurality of computerized models of physical objects from one or more users. In general, the computerized models may be computer aided design (CAD) models, polygonal meshes, stereolithography models, or any other computerized model suitable for representing a three-dimensional object to be fabricated. The users may be authenticated users with accounts maintained on a server such as the management facility described above. Each user may have credentials or the like for identifying the user to the platform, and the user may have associated metadata such as a user profile, a user role, a user entity or organization, and so forth, any of which may be used for establishing privileges within the system, determining relationships with other users, and so forth.

As shown in step 1104, the method 1100 may include positioning the models within a staging area or other area of a virtual environment. This may include automatically positioning the computerized models on a print tray or trays, or this may include manually positioning the computerized models. Where the method 1100 is deployed in the context of a model shop or similar in-house fabrication facility, this may include transmitting a request for fabrication to a human curator, administrator, manager, or the like, who is responsible for managing print resources at the model shop. The administrator may, in turn, manually place models into a print tray using any suitable computerized tools to assist in the placement process. In an open process, this may include receiving computerized models and automatically placing each model in a print tray using any suitable rules or constraints.

As shown in step 1106, the method 1100 may include submitting the print tray to a print queue for allocation to one of a plurality of 3D printers.

As shown in step 1108, the method 1100 may include providing a user interface allowing user access to the shared model space. This may include any of the user interfaces described herein. In one aspect, a user interaction with the shared model space such as viewing a staging area or modifying a computerized model on a print tray, may be dependent on an identity of the user. Thus, for example, a user's ability to view, move, modify, delete, or prioritize may depend on access privileges associated with the specific user, or a relationship between the specific user and other users with models in a staging area.

The user interface may support a variety of user interactions. For example, the user interaction may include viewing a shared model space through the user interface, e.g. by one of the users that placed one of the computerized models in a staging area or any other user registered or otherwise authorized to use print trays or the management facility. In this context, each computerized model may be rendered within the user interface in a manner dependent upon a relationship between the computerized models and the user that is viewing the models. As such, a user that owns or submitted one of the computerized models may have a fully detailed or high resolution view of that computerized model, while having only a degraded view of other ones of the computerize models. This selective viewing may also be role-based so that each one of the computerized models is rendered within the user interface according to whether a user that is viewing the virtual workspace or print tray is authorized to view that computerized model. So, for example, an owner may have a normal view, such as a high-resolution wireframe or surface model that shows all surface and/or interior details of one of the computerized models (subject, of course, to the scale of the features, the resolution of the display, and any suitable limitations on resolution or the like that are imposed by the user interface or a device that is used to view the interface). At the same time, other users such as a direct supervisor of the owner, or other users belonging to a common working group, design team, and so forth may share this full resolution view.

Similarly, unrelated users, or users without a corresponding role or suitably elevated privileges, may be prevented from viewing the computerized model at full resolution, and may be provided with an obfuscated view. An obfuscated view, also referred to herein as a cloaked view or cloaked rendering, in which details of a computerized model are concealed from viewing by certain users by spatial low-pass filtering, enclosure in a convex hull, enclosure in a simple geometric volume bounded by dimensional limits of the object, low-resolution pixilation, fogging, random perturbations, pseudo-random distortions, perturbations, non-linear warping, addition of high-frequency noise, or any other suitable technique or combination of techniques that protect confidentiality while providing sufficient awareness to other users of all models within a staging area. The cloaked rendering may include an out-of-focus rendering, a clouded rendering, or any other rendering that prevents the first viewer from seeing surface details of the second object. In another aspect, an opaque two-dimensional shape may be interposed between the object and a user pose for the rendered virtual workspace or print tray to directly obstruct viewing of the object. In another aspect, the object may not be rendered at all, e.g., so that the space appears empty within the virtual workspace or print tray even though an object is actually within that space of the virtual workspace or print tray and being queued for fabrication with the rest of the virtual workspace or print tray. More generally, any combination of these or other techniques may be used to hide details of the second object from the first user or any other users that are not authorized to view the second object.

By controlling views of individual computerized models within a staging area in this manner, a user may receive a user-specific view of the staging area in which certain models can be viewed in full resolution while other models are obfuscated. As a significant advantage, this approach permits a user to share fabrication resources with other users without requiring the user to publish three-dimensional content into a public print queue or otherwise release the content in an uncontrolled manner into a shared virtual resource. The user interface may also provide a control within the user interface so that an owner of one of the computerized models can control how the computerized model is rendered for other users that are viewing a staging area.

In another aspect, the user interaction may include a modification by one of the users to one of the computerized models. In general, the user interface may support model editing or the like through the user interface, which may be limited to an owner of a computerized model (e.g., the user that submitted the computerized model for fabrication, a user identified in metadata for the computerized model, or some other user), or limited to users having a predetermined relationship with the user via corporate role, express grant of permissions, or the like. By way of non-limiting example, the modification may include a change to a position of one of the computerized models or a change of orientation of one of the models, as well as related operations such as scaling, copying, cropping, subdividing, or other modifications where such modifications are supported by a shared model space. The modification may also or instead include a removal of one of the computerized models from a staging area or a movement of one of the computerized models from one print tray to a second print tray.

One or more of the computerized models may be labelled within the user interface with owner information or other useful metadata. For example, owner information may include a user name, an organization name, a user type, a role, or any other information about the user suitable for display within the user interface. The owner information may also or instead include descriptive information such as annotations provided by the owner for display with the computerized model, for viewing by either the user, by other users, or some combination of these.

In one aspect, a user may only be presented with owner information for models that the user submitted. In another aspect, the user may be presented with owner information for related users based on, e.g., entity affiliation, user role, design team, and so forth. The user may share information with other, specific users so that those other users can identify the sharing user's objects within a staging area.

As shown in step 1110, the method 1100 may include displaying the print queue within the user interface, such as by displaying a list of print jobs ahead of a print tray, or by graphically displaying a number of print trays within the queue in the order in which they are pending for fabrication. This may also or instead include displaying separate queues for each of the 3D printers, so that a user can view whether a print tray has been allocated to a printer, where each print tray has been allocated, and where each allocated print tray is in the local queue for one of the printers.

As shown in step 1112, the method 1100 may include allocating the print trays to one of the 3D printers based on one or more criteria. This may be any suitable criteria including, by way of non-limiting examples, printer capability, a printer location, a model feature for one or more of the models, a priority of the models to be printed, and a relationship among models in the print trays and models in one or more other print trays. Other useful or necessary criteria may also or instead include build resolution requirements, build material requirements, model features, geographic proximity, existing print queue wait times, user priority, build time estimates, or any other criterion or combination of criteria useful for improving efficiency, throughput, cost effectiveness, user satisfaction, or any other metric or combination of metrics that might be used to measure satisfactory performance of a multi-user, multi-printer system as contemplated herein.

As shown in step 1114, the method 1100 may include fabricating the computerized models on the print trays using one of the 3D printers, more specifically, the printer selected in step 1112. The user interface may be usefully configured to provide status updates, such as by displaying a visualization of build status within the user interface. Suitable visualizations may vary according to where the print tray is in the queue or in fabrication, and may, for example, include a position of the print tray in the print queue (e.g., "two jobs ahead of you for this printer"), a time until printing begins, an amount of completion, a time until printing will finish, and any other useful information, which may be displayed alphanumerically (e.g., "57%" or "halfway done") or graphically, such as by rendering and updating an image of a partially built object according to how much of the object has been fabricated.

In another aspect, there is disclosed herein a system for managing multi-user access to fabrication resources, the system comprising a plurality of 3D printers and a management facility. The management facility may be coupled to the plurality of 3D printers through a data network, and the management facility may include a processor and a memory. The management facility may be configured by program code stored in the memory and executable by the processor to perform the steps of: receiving a plurality of computerized models of physical objects from one or more users; automatically positioning the plurality of computerized models within a print tray corresponding to a build volume of a fabrication resource; submitting the print tray to a print queue for allocation to one of the plurality of 3D printers; and providing a user interface for access by a user to the shared virtual workspace, wherein a user interaction with the virtual workspace or print tray is dependent on an identity of the user.

Figure 12:
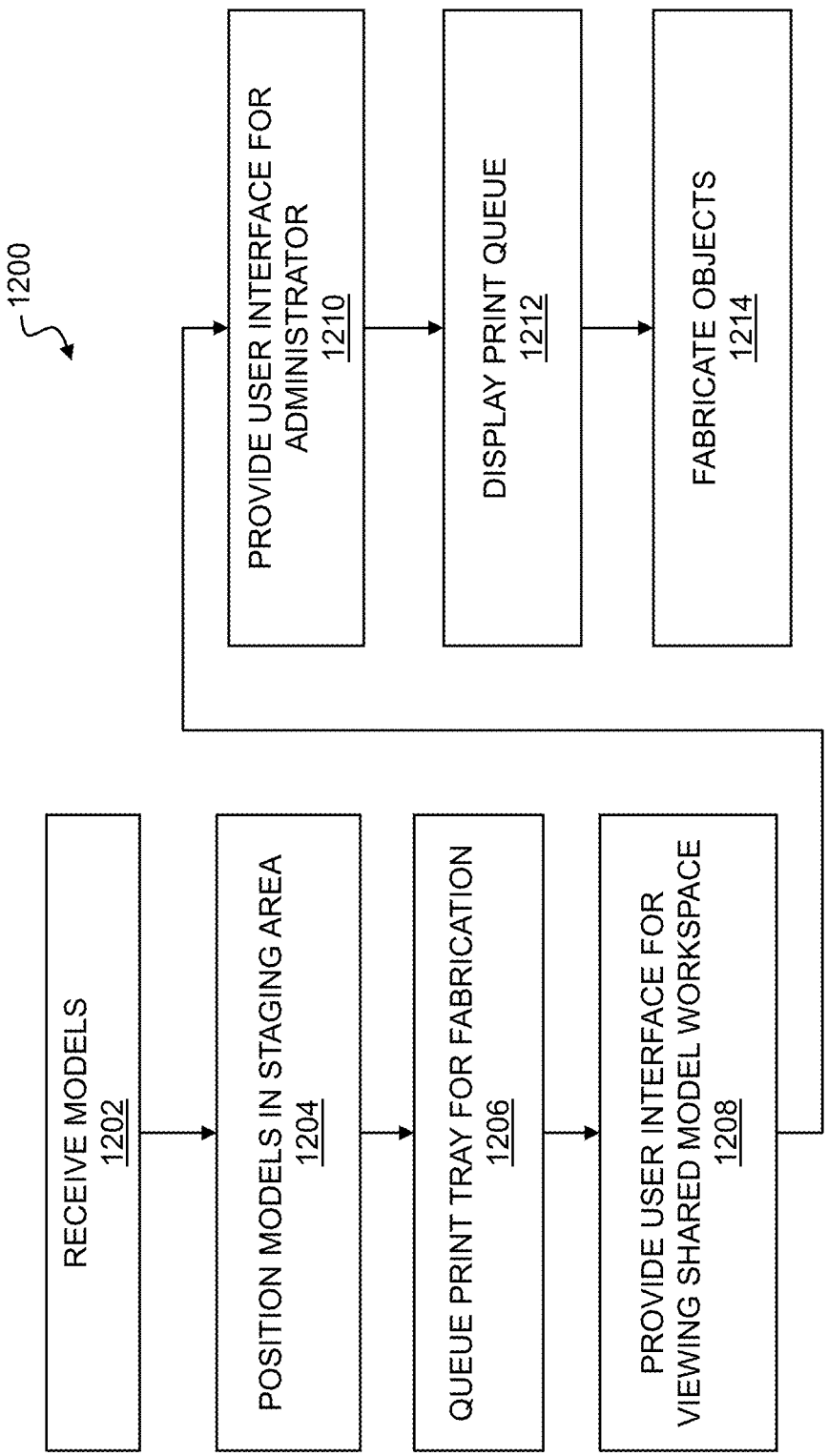
FIG. 12 shows a flow chart of a method for managing views of a multi-user print job.

FIG. 12 shows a flow chart of a method for managing views of a multi-user print job. In a model shop or similar environment, a single printer or small group of printers may be controlled by a manager who allocates incoming requests manually or semi-automatically to the printer(s). In this context, many of the techniques described above may be advantageously employed for providing user-dependent rendering of models within a shared virtual workspace or print tray so that users can control, e.g., whether other users or user types can view an object that they have submitted. Furthermore, in the context of a managed shared virtual workspace and print queue, the user interface may usefully support user requests for modifications, where a request is received in the user interface, forwarded to a manager for review and action, and then processed at the manager's discretion. These and other aspects of a multi-user, managed printing resource are described in greater detail below.

As shown in step 1202, the method 1200 may include receiving models such as any of the computerized models described herein. This may, for example, include receiving a first computerized model of a first object from a first user for fabrication with a 3D printer, such as a 3D printer managed in a model shop or other local fabrication context. Additional models may also be received before, concurrently with, or after the first computerized model. For example, the method 1200 may include receiving a second computerized model of a second object from a second user different than the first user for fabrication with the 3D printer. The method may also or instead include receiving any number of other models, such as through a user input of an additional model to the virtual workspace or print tray that contains the first computerized model and the second computerized model. More generally, any number of models may be received in any order, and may be allocated to the shared virtual workspace or print tray according to, e.g., user priority, manual administrator selections, capacity of the shared virtual workspace or print tray, and so forth.

As shown in step 1204, the method 1200 may include positioning the models within a staging area. The staging area may include a virtual representation of one or more virtual environments for the 3D printer or printers, or more generally any computer representation of a build volume of the 3D printer. Positioning may generally include positioning the first computerized model within a print tray in the staging area and positioning the second computerized object within the same or a different print tray in the staging area.

As shown in step 1206, the method 1200 may include queueing the print tray(s) (including the first computerized model and the second computerized model) for fabrication with the 3D printer, such as by submitting the print tray(s) to a print queue for the printer, or to a multi-printer queue for allocation to one of a number of different printers.

As shown in step 1208, the method 1200 may include providing a user interface to the first user with a view of the shared model workspace. The view of the staging area within the shared model workspace may include a cloaked rendering of the second object that obfuscates one or more features of the second object so that the first user is unable to view the detailed shape and/or features of the second object. The obfuscated view may take any form such as is previously described herein.

In an aspect, cloaking may be explicitly or implicitly controlled. With implicit control, cloaking may be conditionally provided according to a role, user privileges or other attributes of the user that is viewing an object relative to a user (e.g., the owner) that submitted the object for fabrication. For example, a direct supervisor within an organization may view objects submitted by supervisees in full detail, while the same user (the supervisor) may be prevent from viewing objects submitted by other technical teams or groups. In an explicit control technique, a user may specify people, groups of people, or types of people (e.g., by role or the like) who can view an object. Individual users may be invited and given permission to view an object from the submitter, or a user may be given permission to view any objects submitted by the submitter. In another aspect, implicit and explicit controls may be used in combination, and may also or instead be hierarchical in nature so that explicit controls override explicit permissions or vice versa. In yet another aspect, the degree of obfuscation may be varied so that different users can view different amounts of detail.

Other user controls may also or instead be supported within the user interface for the virtual workspace or print tray. For example, the user interface may be configured to present annotations about an owner of one of the computerized models. This may, for example, include automatically generated annotations based on, e.g., a user profile, a user role, a user name, a user fabrication history, and so forth. This may also or instead include user-provided annotations about the user, or about the object that is submitted, such as a title of the object, description of the object, or other object metadata that might be of interest to other users of the virtual workspace or print tray.

As another example, the user interface may display status of a print job that includes a rendering of the extent of build completion. This may, for example, include a time until the print job is started, a time until the print job is completed, a percentage completion, a visual rendering, an actual camera or video view, or any other useful status information. This status information may be provided in a number of different formats. For example, the status may include a textual description of the print job, which may be displayed within the user interface, in a pop-up window accompanying the user interface, or in any other suitable manner. The status may also or instead include a visual rendering of a current state of the print job such as a rendering of the print tray showing completed portions of the objects, along with a wireframe or other simplified line rendering or the like of portions of the object(s) that have not yet been fabricated. Other useful visual renderings may include a status bar, a dial, or other progress indicator that shows progress of the print job. More generally any techniques for visually and/or textually conveying information about the status of fabrication may be usefully employed to display status as contemplated herein.

Providing the user interface may also or instead include providing a control within the user interface for the first user to request a modification to that user's computerized model within the shared virtual workspace or print tray. In general, within the model shop or similarly local context where users have manually managed access to a 3D printer, users with objects in the queue may be provided with various tools or controls to request changes to submitted objects. For example, the modification may include a removal of the first computerized model. The modification may also or instead include a change to at least one of a position and an orientation of the first computerized model on a print tray. The modification may also or instead include a scaling of the first computerized model within the shared virtual workspace or print tray, or any other modification that might be requested by a user. The request may be submitted within the user interface, and then forwarded to an administrator, manager, or other supervisor for action. Responses to requests may also or instead be automated or semi-automated so that a human administrator only needs to respond to certain types of requests, or to review requests after than have been automatically processed.

As shown in step 1210, the method 1200 may include providing an administrator interface as a second interface (e.g., different than the interface for users submitting models). This interface may be used by a manager, administrator, or similar user responsible for the shared virtual workspace or print tray, and may provide administrative functions such as queueing the print trays for fabrication on a 3D printer or other fabrication platform. Other operations may similarly be supported. For example, the second interface may be configured for a manager to respond to a modification requested by one of the users in the first interface so that user requests can be received and acted upon in a timely manner.

As shown in step 1212, the method 1200 may include displaying a print queue for the 3D printer in a user interface, which may, for example, include any of the interfaces described above (e.g., the interface for users or the interface for administrators), or an independent user interface configured specifically for viewing the print queue. The print queue interface may receive various user inputs, such as a user input requesting a change to an order of items in the print queue, removal of an object from a print tray, or other modification to the order of objects. Where multiple fabrication resources are supported, the print queue may include a global print queue of all print trays in an expected order of completion, or the print queue may display individual print queues for each available resource, or some combination of these.

As shown in step 1214, the method 1200 may include fabricating objects in the available connected or networked group of 3D printers. For example, this may include fabricating the first object, the second object, and any other objects in a single fabrication process with a 3D printer or other suitable fabrication resource.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising non-transitory computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems or the like described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for managing multi-user access to fabrication resources, the computer program product comprising computer executable code embodied in a non-transitory computer-readable medium that, when executing on one or more computing devices, performs the steps of:
   receiving computerized models of physical objects from one or more users;
   automatically positioning the computerized models within a virtual print tray corresponding to a build volume of a fabrication resource;
   submitting the virtual print tray to a print queue for allocation to one of a plurality of three-dimensional (3D) printers;
   providing a user interface for access by a user of the one or more users to the virtual print tray, wherein the one or more users may interact with the computerized models positioned on the virtual print tray, and wherein a user interaction with the virtual print tray is dependent on an identity of the user;
   receiving a type-specific lock of one of the computerized models from one of the users, wherein the type-specific lock includes an orientation lock that locks a rotation of the one of the computerized models for fabrication in a specific orientation relative to the build volume while permitting rotation of the object about a vertical axis of the build volume; and
   fabricating the computerized models in the virtual print tray using one of the 3D printers.

2. A system for managing multi-user access to fabrication resources, the system comprising:
   a plurality of three-dimensional (3D) printers; and
   a management facility coupled to the plurality of 3D printers through a data network, the management facility including a processor and a memory, wherein the management facility is configured by program code stored in the memory and executable by the processor to perform the steps of: receiving computerized models of physical objects from one or more users; automatically positioning the computerized models within a virtual print tray corresponding to a build volume of a fabrication resource; submitting the virtual print tray to a print queue for allocation to one of the plurality of 3D printers; providing a user interface for access by a user of the one or more users to the virtual print tray, wherein the one or more users may interact with the computerized models positioned on the virtual print tray, and wherein a user interaction with the virtual print tray is dependent on an identity of the user; receiving a type-specific lock of one of the computerized models from one of the users, wherein the type-specific lock includes an orientation lock that locks a rotation of the one of the computerized models for fabrication in a specific orientation relative to the build volume while permitting rotation of the object about a vertical axis of the build volume; and fabricating the computerized models in the virtual print tray using one of the 3D printers.

3. A method for managing multi-user access to fabrication resources, the method comprising:
   receiving computerized models of physical objects from one or more users;
   automatically positioning the computerized models within a virtual print tray corresponding to a build volume of a fabrication resource;
   submitting the virtual print tray to a print queue for allocation to one of a plurality of three-dimensional (3D) printers;
   providing a user interface for access by a user of the one or more users to the virtual print tray, wherein the one or more users may interact with the computerized models positioned on the virtual print tray, and wherein a user interaction with the virtual print tray is dependent on an identity of the user;
   receiving a type-specific lock of one of the computerized models from one of the users, wherein the type-specific lock includes an orientation lock that locks a rotation of the one of the computerized models for fabrication in a specific orientation relative to the build volume while permitting rotation of the object about a vertical axis of the build volume; and
   fabricating the computerized models in the virtual print tray using one of the 3D printers.

4. The method of claim 3 wherein the user interaction includes viewing the virtual print tray through the user interface by one of the users.

5. The method of claim 4 wherein each one of the computerized models is rendered within the user interface based on at least one of: (i) a relationship between the one of the computerized models and the one of the users viewing the user interface; and (ii) whether the one of the users has a role that is authorized to view that one of the computerized models.

6. The method of claim 3 wherein the user interaction includes a modification by one of the users to one of the computerized models.

7. The method of claim 6 wherein the modification includes at least one of: (i) a change to at least one of a position and an orientation of the one of the computerized models; (ii) a movement of the one of the computerized models from the virtual print tray to a second virtual print tray; and (iii) a removal of the one of the computerized models from the virtual print tray.

8. The method of claim 3 wherein one of the computerized models is labelled within the user interface with owner information for an owner of the one of the computerized models.

9. The method of claim 3 further comprising allocating the virtual print tray to one of the 3D printers based on one or more criteria, wherein the one or more criteria include at least one of a printer capability, a printer location, a model feature for one or more of the computerized models, a priority of the virtual print tray, and a relationship among the computerized models in the virtual print tray and a number of other computerized models in one or more other virtual print trays.

10. The method of claim 3 further comprising displaying a visualization of build status within the user interface, wherein the visualization of build status includes at least one of a position of the virtual print tray in the print queue, a time until printing begins, an amount of completion, and a time until printing will finish.

11. The method of claim 3 further comprising a control within the user interface for an owner of one of the computerized models to control how the one of the computerized models is rendered for other users viewing the virtual print tray.

12. The method of claim 3 further comprising displaying a print queue for the plurality of 3D printers in a user interface.

13. The method of claim 12 further comprising receiving a user input in the user interface modifying an order of items in the print queue.

14. The method of claim 3 further comprising receiving a user input of an additional model to the virtual print tray containing the computerized models.

15. The method of claim 3 further comprising selecting one of the plurality of 3D printers to fabricate the virtual print tray based on a manual user input to a user interface.

16. The method of claim 3 further comprising selecting at least two models for placement in the virtual print tray based upon a relationship between the at least two models, wherein the at least two models include a first computerized model of the computerized models and a second computerized model of the computerized models, and wherein the relationship includes one or more of: a geometric relationship, a relationship among users submitting the first computerized model and the second computerized model, a relationship of the first computerized model and the second computerized model to a multi-part object, and a relative priority of the second computerized model to the first computerized model.

17. The method of claim 3 further comprising automatically suggesting a combination of two or more virtual print trays in the print queue for fabricating a number of computerized models from the user.

18. The method of claim 3 further comprising receiving a user comment within a virtual environment including the print tray, wherein the user comment is made available to one or more other users of the virtual environment.

19. The method of claim 3 further comprising receiving a user input locking the virtual print tray to prevent further changes.

20. The method of claim 3 wherein the type-specific lock is received after the one of the computerized models is positioned on the virtual print tray.

21. The method of claim 3 wherein the type-specific lock controls permissions for a translation of the one of the computerized models within the virtual print tray.

22. The method of claim 3 wherein the orientation lock locks the rotation on one or more axes within the virtual print tray.

23. The method of claim 3 further comprising receiving a variable locking including a lock of a first one of the computerized models to prevent a subsequent manipulation of the first one of the computerized models by a second user.

24. The method of claim 3 further comprising automatically placing one or more of the computerized models within the virtual print tray.

25. The method of claim 24 further comprising receiving a user input overriding an automatic positioning of at least one of the computerized models to permit a repositioning the at least one of the computerized models within the virtual print tray or a movement of the at least one of the computerized models to a different print tray within a queue of available fabrication resources.

26. The method of claim 3 further comprising automatically locking the virtual print tray to prevent changes by any of the one or more users after a predetermined time before fabrication of the virtual print tray.

27. The method of claim 3 wherein the type-specific lock includes an obfuscation lock that provides a cloaked rendering that obfuscates one or more features of the one of the computerized models so that other users are unable to view a detailed shape or features of the one of the computerized models.

28. The method of claim 3 wherein the user can only interact with one or more of the computerized models that were positioned on the virtual print tray by the user.

29. The method of claim 3 wherein the user controls permissions by other users to manipulate the one of the computerized models placed on the virtual print tray by the user.

30. The method of claim 3 further comprising receiving a general lock that permits no third-party changes to the one of the computerized models.

* * * * *